United States Patent
Onozawa et al.

(10) Patent No.: US 12,029,979 B2
(45) Date of Patent: *Jul. 9, 2024

(54) IMAGE DISPLAY SYSTEM, NON-TRANSITORY STORAGE MEDIUM HAVING STORED THEREIN IMAGE DISPLAY PROGRAM, DISPLAY CONTROL APPARATUS, AND IMAGE DISPLAY METHOD

(71) Applicant: NINTENDO CO., LTD., Kyoto (JP)

(72) Inventors: Yuki Onozawa, Kyoto (JP); Daigo Shimizu, Kyoto (JP); Kentaro Kawai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,118

(22) Filed: Jul. 26, 2023

(65) Prior Publication Data
US 2023/0364511 A1 Nov. 16, 2023

Related U.S. Application Data

(63) Continuation of application No. 16/808,761, filed on Mar. 4, 2020, now Pat. No. 11,752,430.

(30) Foreign Application Priority Data

Mar. 20, 2019 (JP) ................. 2019-053213

(51) Int. Cl.
*A63F 13/5258* (2014.01)
*G02B 27/01* (2006.01)
(Continued)

(52) U.S. Cl.
CPC ...... *A63F 13/5258* (2014.09); *G02B 27/0172* (2013.01); *G02B 27/0179* (2013.01);
(Continued)

(58) Field of Classification Search
CPC ............ A63F 13/5258; G02B 27/0172; G02B 27/0179; G02B 2027/0136;
(Continued)

(56) References Cited

U.S. PATENT DOCUMENTS

| 9,870,118 B2 | 1/2018 | Miyamoto |
| 11,069,107 B2 | 7/2021 | Onozawa |

(Continued)

FOREIGN PATENT DOCUMENTS

| EP | 3349183 | 7/2018 |
| JP | 2014-235469 | 12/2014 |

(Continued)

OTHER PUBLICATIONS

Extended European Search Report dated Jul. 31, 2020 in corresponding European Application No. 20161878.2, 8 pages.

(Continued)

*Primary Examiner* — Kwang-Su Yang
(74) *Attorney, Agent, or Firm* — Nixon & Vanderhye, PC

(57) ABSTRACT

An example of an image display system includes a goggle apparatus including a display section. A virtual camera and a user interface are placed in a virtual space. In accordance with the orientation of the goggle apparatus, the orientation of the virtual camera in the virtual space is controlled. For example, in a case where the line of sight of the virtual camera rotates in a left direction in a yaw direction and then reverses in a right direction, and when the amount of change in the right direction is greater than or equal to a threshold, the user interface is moved to the front of the virtual camera.

20 Claims, 15 Drawing Sheets

(51) Int. Cl.
*G06T 7/73* (2017.01)
*G06T 19/00* (2011.01)
*H04N 13/344* (2018.01)

(52) U.S. Cl.
CPC .............. *G06T 7/74* (2017.01); *G06T 19/006* (2013.01); *H04N 13/344* (2018.05); *G02B 2027/0134* (2013.01); *G02B 2027/0136* (2013.01); *G02B 2027/0187* (2013.01)

(58) Field of Classification Search
CPC .......... G02B 2027/0134; H04N 13/344; G06T 19/006; G06T 7/74
See application file for complete search history.

(56) References Cited

U.S. PATENT DOCUMENTS

| | | |
|---|---|---|
| 2006/0119576 A1 | 6/2006 | Richardson |
| 2013/0246967 A1 | 9/2013 | Wheeler |
| 2014/0354683 A1 | 12/2014 | Suzuki et al. |
| 2014/0357358 A1* | 12/2014 | Shikata .................. A63F 13/00 463/31 |
| 2017/0199565 A1 | 7/2017 | Dong |
| 2018/0247454 A1* | 8/2018 | Sawaki .................. G06T 15/20 |
| 2019/0295285 A1 | 9/2019 | Shinohara |

FOREIGN PATENT DOCUMENTS

| | | |
|---|---|---|
| JP | 2016-514314 | 5/2016 |
| JP | 2018-192272 | 12/2018 |
| JP | 2020-024417 | 2/2020 |
| WO | 2014/158633 | 10/2014 |
| WO | 2018/204419 | 11/2018 |

OTHER PUBLICATIONS

Extended European Search Report issued on Jul. 31, 2020 in corresponding European Application No. 20161878.2, 8 pages.

* cited by examiner

F I G. 12
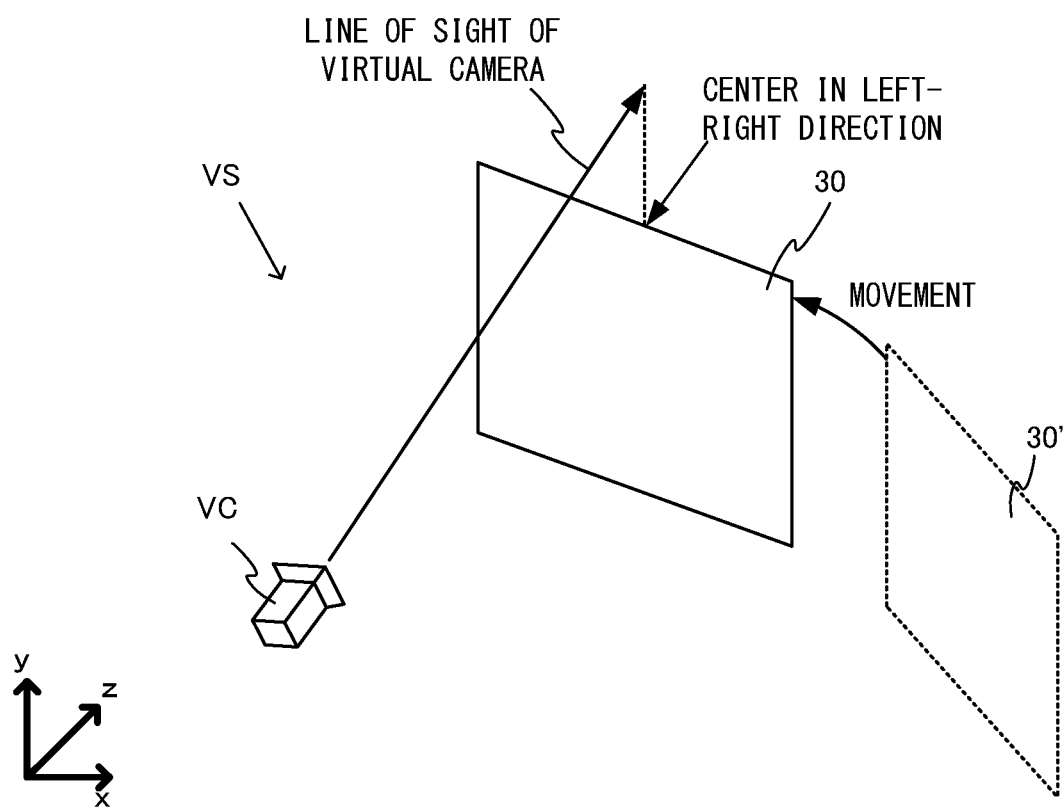

F I G. 13A
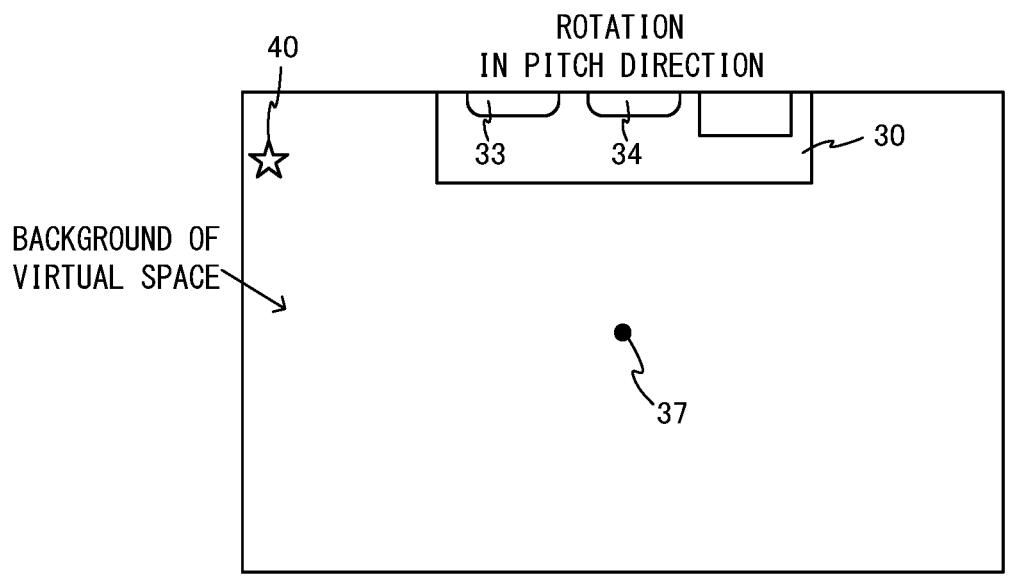
F I G. 13B
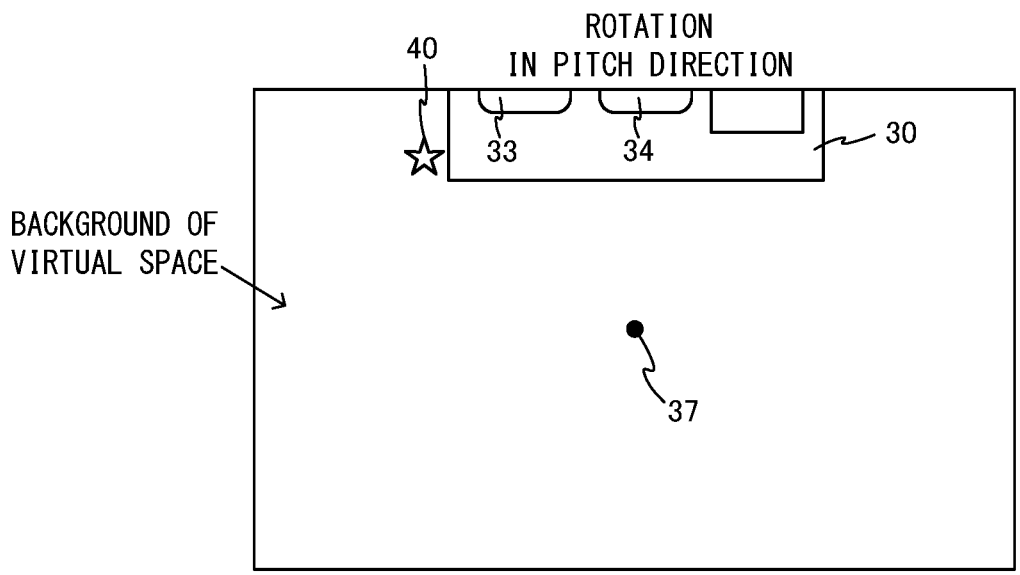

F I G. 14

| PROGRAM |
|---|
| ANGULAR VELOCITY DATA |
| VIRTUAL CAMERA DATA |
| UI DATA |
| ACCUMULATION VALUE X1 |
| ACCUMULATION VALUE X2 |
| ACCUMULATION VALUE Y1 |
| ACCUMULATION VALUE Y2 |
| AMOUNT OF CHANGE Rx |
| AMOUNT OF CHANGE Ry |

IMAGE DISPLAY SYSTEM, NON-TRANSITORY STORAGE MEDIUM HAVING STORED THEREIN IMAGE DISPLAY PROGRAM, DISPLAY CONTROL APPARATUS, AND IMAGE DISPLAY METHOD

CROSS REFERENCE TO RELATED APPLICATION

This application is a continuation of U.S. application Ser. No. 16/808,761, filed Mar. 4, 2020, and this application claims priority to Japanese Patent Application No. 2019-053213, filed on Mar. 20, 2019. The contents of the aforementioned applications are incorporated by reference in their entirety.

FIELD

Exemplary embodiments relate to an image display system, a non-transitory storage medium having stored therein an image display program, a display control apparatus, and an image display method that are capable of displaying an image.

BACKGROUND AND SUMMARY

As related art, there is an image display system that places an object in a virtual space and directs the line of sight of a virtual camera to the object while moving in the virtual space, thereby displaying the object.

In the related art, however, to display the object, for example, there is a case where a user needs to perform the operation of directing the line of sight of the virtual camera to the object. There is room for improvement in improving the operability of the object.

Therefore, it is an object of an exemplary embodiment to provide an image display system, an image display program, a display control apparatus, and an image display method that are capable of improving the operability of an object placed in a virtual space.

To achieve the above object, the exemplary embodiment employs the following configurations.

An image display system according to the exemplary embodiment includes a goggle apparatus and at least one processor. The at least one processor is configured to at least: place an object in a virtual space; display, on a display section of the goggle apparatus, an image captured by a virtual camera in the virtual space; acquire an orientation of the goggle apparatus; rotate the virtual camera in the virtual space based on the orientation of the goggle apparatus; detect a change in a line of sight of the virtual camera from one direction to the other direction in a predetermined rotation direction; and based on the detection of the change, perform at least either one of a movement of the object and control of the virtual camera so that at least a part of the object is located within an image capturing range of the virtual camera.

Based on the above, when a line of sight of a virtual camera changes from one direction to the other direction in a predetermined rotation direction, it is possible to locate an object within an image capturing range of the virtual camera by moving the object or controlling the virtual camera. Consequently, in a case where a virtual space is viewed using a goggle apparatus, it is possible to improve the operability of the object.

In another configuration, the at least one processor may be configured to at least calculate an amount of rotation of the virtual camera. The at least one processor may be configured to at least, at least based on the detection of the change and the amount of rotation, perform at least either one of the movement of the object and the control of the virtual camera.

Based on the above, in addition to the detection of the change from the one direction to the other direction, based on the amount of rotation of the virtual camera, it is possible to perform the movement of the object and/or the control of the virtual camera.

In another configuration, the at least one processor may be configured to at least, in a case where the change is detected, and when the amount of rotation after the change is detected is greater than or equal to a threshold, perform at least either one of the movement of the object and the control of the virtual camera.

Based on the above, based on the amount of rotation of the virtual camera after the line of sight of the virtual camera changes from the one direction to the other direction in the predetermined rotation direction, it is possible to perform the movement of the object and/or the control of the virtual camera.

In another configuration, the at least one processor may be configured to at least calculate amounts of rotation in the other direction and/or the one direction in the predetermined rotation direction. The at least one processor may be configured to at least, based on the amounts of rotation in the other direction and/or the one direction in the predetermined rotation direction, perform at least either one of the movement of the object and the control of the virtual camera.

Based on the above, based on the amounts of rotation in the other direction and/or the one direction in the predetermined rotation direction, it is possible to perform the movement of the object or the control of the virtual camera. Consequently, for example, it is possible to prevent the movement of the object and/or the control of the virtual camera by erroneous detection.

In another configuration, the at least one processor may be configured to at least, in a case where the change is detected, and when the amounts of rotation in the other direction and/or the one direction are greater than or equal to a threshold, perform at least either one of the movement of the object and the control of the virtual camera.

Based on the above, in a case where the line of sight of the virtual camera changes from the one direction to the other direction in the predetermined rotation direction, and when the amounts of rotation in the other direction and/or the one direction are greater than or equal to a threshold, it is possible to perform the movement of the object and/or the control of the virtual camera. Consequently, for example, it is possible to prevent the movement of the object and/or the control of the virtual camera by erroneous detection.

In another configuration, the at least one processor may be configured to at least, when accumulation values of the amounts of rotation in the other direction and/or the one direction are greater than or equal to a threshold after the change is detected, perform at least either one of the movement of the object and the control of the virtual camera.

Based on the above, in a case where the line of sight of the virtual camera changes from the one direction to the other direction, and when the accumulation value of the amount of change in the other direction is greater than or equal to a threshold, it is possible to perform the movement of the object and/or the control of the virtual camera.

Consequently, for example, it is possible to prevent the movement of the object and/or the control of the virtual camera by erroneous detection.

In another configuration, the at least one processor may be configured to at least calculate a first amount of rotation in the one direction in the predetermined rotation direction, and a second amount of rotation in the other direction in the predetermined rotation direction. The at least one processor may be configured to at least compare the first amount of rotation and the second amount of rotation, and detect the change based on a result of the comparison.

Based on the above, by comparing the amount of rotation in the one direction with the amount of rotation in the other direction, it is possible to detect a change in the line of sight of the virtual camera from the one direction to the other direction. Thus, it is possible to detect the change by a simple method.

In another configuration, the at least one processor may be configured to at least detect the change based on the smaller of the first amount of rotation and the second amount of rotation.

Based on the above, it is possible to detect the change by simple calculation.

In another configuration, the at least one processor may be configured to at least calculate an accumulation value of the first amount of rotation and an accumulation value of the second amount of rotation. The at least one processor may be configured to at least detect the change based on the smaller of the accumulation value of the first amount of rotation and the accumulation value of the second amount of rotation.

Based on the above, it is possible to detect the change from the one direction to the other direction in the predetermined rotation direction.

In another configuration, the at least one processor may be configured to at least rotate the virtual camera so that the virtual camera is in at least a first orientation in which at least a part of the object is located within the image capturing range of the virtual camera, and a second orientation in which the object is located outside the image capturing range of the virtual camera. The one direction may be a direction in which the virtual camera comes close to the second orientation. The other direction may be a direction in which the virtual camera comes close to the first orientation. The at least one processor may be configured to at least: in a case where the virtual camera is in the second orientation, and when the line of sight of the virtual camera rotates in the other direction, detect the change; in a case where the virtual camera is in the second orientation, and when the line of sight of the virtual camera rotates in the one direction without rotating in the other direction, or when the line of sight of the virtual camera does not rotate, not detect the change; and when the change is detected, perform at least either one of the movement of the object and the control of the virtual camera, and when the change is not detected, not perform at least either one of the movement of the object and the control of the virtual camera.

Based on the above, when the virtual camera is rotated so that the object is included within the image capturing range of the virtual camera, it is possible to perform the movement of the object and/or the control of the virtual camera. In a case where the virtual camera is in a second orientation, and when the line of sight of the virtual camera rotates in the other direction, it is possible to perform the movement of the object and/or the control of the virtual camera.

In another configuration, the at least one processor may be configured to at least rotate the virtual camera so that the virtual camera is in at least a first orientation in which the virtual camera is directed to the object, and a second orientation in which the virtual camera is not directed to the object. The one direction may be a direction in which the virtual camera moves away from the first orientation. The other direction may be a direction in which the virtual camera comes close to the first orientation. The at least one processor may be configured to at least: in a case where the virtual camera is in the second orientation, and when the line of sight of the virtual camera rotates in the other direction, detect the change; in a case where the virtual camera is in the second orientation, and when the line of sight of the virtual camera rotates in the one direction without rotating in the other direction, or when the line of sight of the virtual camera does not rotate, not detect the change; and when the change is detected, perform at least either one of the movement of the object and the control of the virtual camera, and when the change is not detected, not perform at least either one of the movement of the object and the control of the virtual camera.

Based on the above, when the virtual camera is rotated so that the virtual camera is directed to the object, it is possible to perform the movement of the object and/or the control of the virtual camera. In a case where the virtual camera is in a second orientation, and when the line of sight of the virtual camera rotates in the other direction, it is possible to perform the movement of the object and/or the control of the virtual camera.

In another configuration, the second orientation may be the orientation in which the object is present in a left-right direction of the line of sight of the virtual camera.

Based on the above, in a case where the line of sight of the virtual camera is directed in the left-right direction with respect to the object, and when the change is detected, it is possible to perform the movement of the object and/or the control of the virtual camera.

In another configuration, the predetermined rotation direction may be a yaw direction in the virtual space.

Based on the above, a change in the line of sight of the virtual camera from one direction (e.g., a left direction) to the other direction (e.g., the right direction) in a yaw direction is detected, and based on the detection of the change, it is possible to perform the movement of the object and/or the control of the virtual camera.

In another configuration, the at least one processor may be configured to at least enable the line of sight of the virtual camera to rotate in a second rotation direction orthogonal to the predetermined rotation direction. The at least one processor may be configured to at least further detect a change in the line of sight of the virtual camera from one direction to the other direction in the second rotation direction.

Based on the above, it is possible to detect a change from one direction to the other direction with respect to a second rotation direction in addition to the predetermined rotation direction. Based on the detection of the change, it is possible to perform the movement of the object and/or the control of the virtual camera.

In another configuration, the predetermined rotation direction may be a pitch direction in the virtual space.

Based on the above, a change in the line of sight of the virtual camera from one direction (e.g., an up direction) to the other direction (e.g., the down direction) in a pitch direction is detected. Based on the detection of the change, it is possible to perform the movement of the object and/or the control of the virtual camera.

In another configuration, the object may be a user interface that can be operated by a user.

Based on the above, for example, it is possible to move a user interface so that the user interface is located within the image capturing range of the virtual camera. Consequently, it is possible to improve the operability of the user interface.

In another configuration, the at least one processor may be configured to at least set a pointer indicating the object. The at least one processor may be configured to at least: based on the orientation of the goggle apparatus, move a position indicated by the pointer; and after the pointer moves away from an area based on the object, and when a moving direction of the pointer reverses, detect the change.

Based on the above, for example, when a pointer moves away from a display area of the object, it is possible to detect the change. Consequently, for example, when the pointer is located in the display area of the object, it is possible to prevent the object from moving based on the detection of the change. Thus, it is possible to improve the operability. After the pointer moves in a direction away from an area, and when the moving direction of the pointer reverses, it is possible to detect a change in the line of sight of the virtual camera from one direction to the other direction, it is possible to perform the movement of the object and/or the control of the virtual camera.

In another configuration, the at least one processor may be configured to at least, when the pointer is not present in the area, calculate an amount of change in rotation in the one direction and the other direction in the predetermined rotation direction.

Based on the above, for example, when the pointer is not located in a display area of a user interface, the amount of change is calculated, and when the pointer is located in the display area of the user interface, it is possible to prevent the amount of change from being calculated. It is possible to reduce a load applied to the calculation of the amount of change.

In another configuration, the at least one processor may be configured to at least, when the pointer enters the area, reset the amount of change.

Based on the above, even when the pointer enters the area or comes out of the area, based on the amount of change after the pointer comes out of the area, it is possible to detect the change.

In another configuration, the at least one processor may be configured to at least, when the line of sight of the virtual camera based on the object is at a certain angle, detect the change.

Based on the above, when the line of sight of the virtual camera is at a certain angle to the object, it is possible to detect the change.

In another configuration, the at least one processor may be configured to at least select the object in accordance with an orientation of the virtual camera. The at least one processor may be configured to at least, when the object is not selected, perform at least either one of the movement of the object and the control of the virtual camera.

Based on the above, when the object is not selected, it is possible to perform the movement of the object and/or control of the virtual camera.

In another configuration, the at least one processor may be configured to at least, even when the change is not detected, in accordance with an operation of a user, perform the movement of the object or the control of the virtual camera so that at least a part of the object is located within the image capturing range of the virtual camera.

Based on the above, in accordance with a predetermined operation, it is possible to perform the movement of the object and/or the control of the virtual camera, regardless of whether or not the change is detected.

In another configuration, the at least one processor may be configured to at least detect that the total number of times of reversal of the line of sight of the virtual camera from the one direction to the other direction and reversal of the line of sight of the virtual camera from the other direction to the one direction is a predetermined number of times. The at least one processor may be configured to at least, when it is detected that the number of times the line of sight of the virtual camera reverses is the predetermined number of times, perform at least either one of the movement of the object and the control of the virtual camera.

Based on the above, based on the number of times the line of sight of the virtual camera reverses, it is possible to perform the movement of the object and/or the control of the virtual camera. Consequently, for example, it is possible to prevent erroneous detection.

Another exemplary embodiment may be an image display program that causes a processor of an apparatus that displays an image on a display section of a goggle apparatus to perform the above processing. Another exemplary embodiment may be a display control apparatus that displays an image on a display section of a goggle apparatus, and also may be an apparatus that executes the above processing. Another exemplary embodiment may be an image display method performed by the image display system including a goggle apparatus.

According to the exemplary embodiment, when a line of sight of a virtual camera changes from one direction to the other direction in a predetermined rotation direction, it is possible to locate an object within an image capturing range of the virtual camera. Consequently, in a case where a virtual space is viewed using a goggle apparatus, it is possible to improve the operability of the object.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 12 is a diagram showing an example non-limiting state where the UI object 30 moves in a case where the line of sight of the virtual camera VC is present in an A-area;

FIG. 13A is a diagram showing an example non-limiting image displayed on the display section 21 in a case where the line of sight of the virtual camera VC rotates in the down direction and enters the A-area;

FIG. 13B is a diagram showing an example non-limiting image displayed on the display section 21 when the virtual camera VC rotates in the left direction from the state in FIG. 13A;

FIG. 14 is a diagram showing example non-limiting data stored in (a DRAM 23 of) the information processing apparatus 2;

DETAILED DESCRIPTION OF NON-LIMITING EXAMPLE EMBODIMENTS (Configuration of Image Display System)

Figure 1:
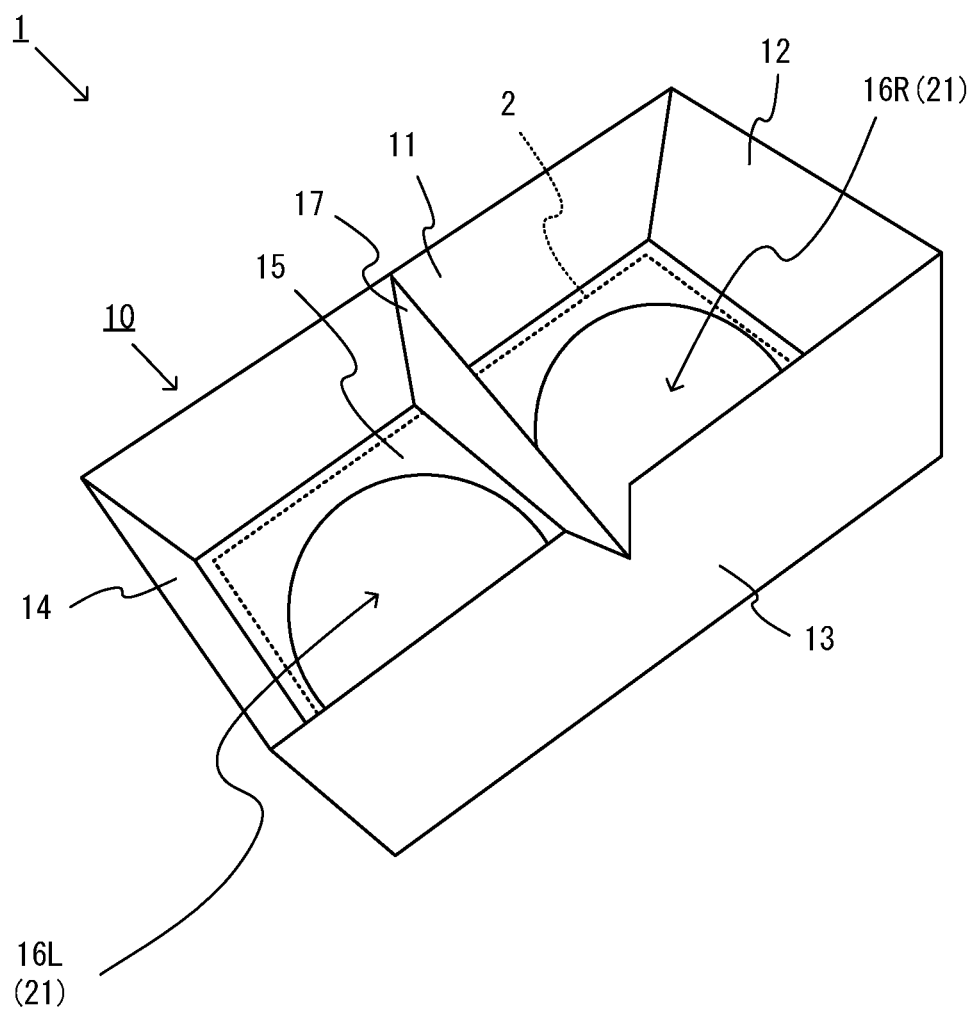
FIG. 1 is a diagram showing an example non-limiting image display system 1 according to the exemplary embodiment.
Figure 2:
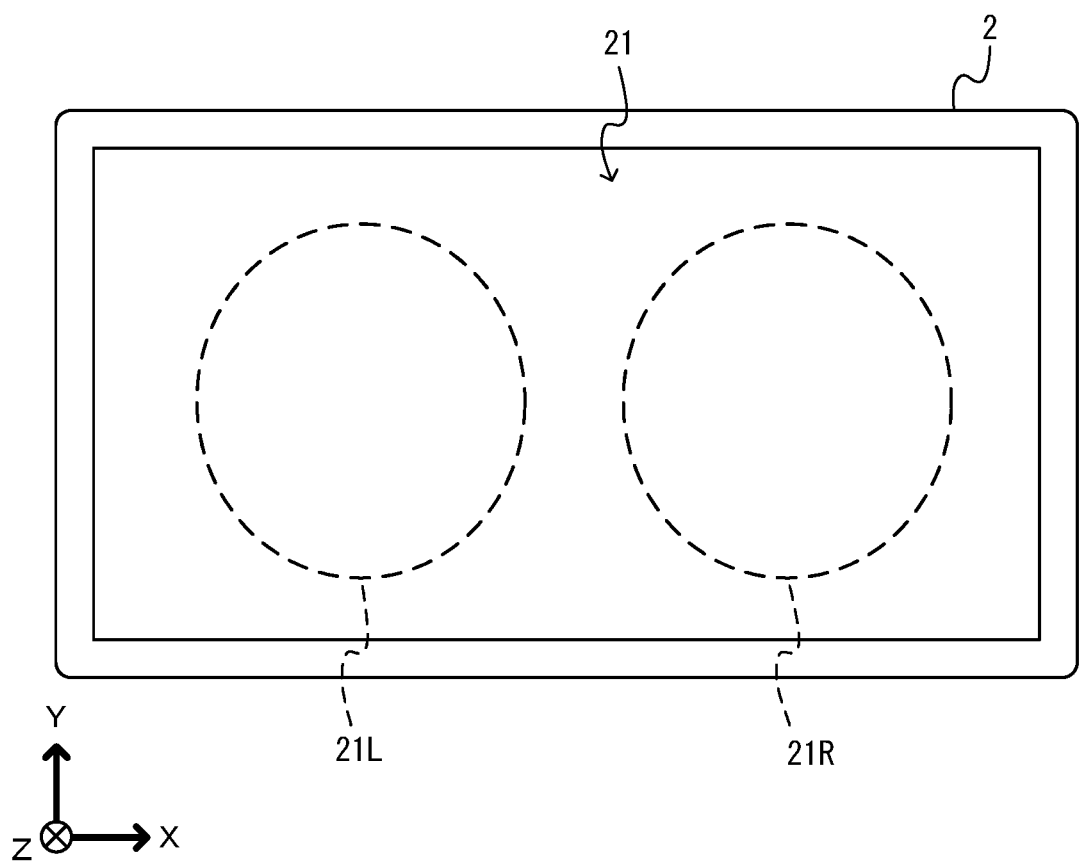
FIG. 2 is a diagram showing an example non-limiting external appearance of an information processing apparatus 2 included in the image display system 1 and including a display section 21.

With reference to the drawings, an image display system 1 according to an exemplary embodiment is described below. The image display system 1 according to the exemplary embodiment allows a user to experience virtual reality (VR). FIG. 1 is a diagram showing an example of the image display system 1 according to the exemplary embodiment. FIG. 2 is a diagram showing an example of the external appearance of an information processing apparatus 2 included in the image display system 1 and including a display section 21.

As shown in FIG. 1, the image display system 1 includes a goggle apparatus 10. The goggle apparatus 10 is held by both hands or one hand of the user and put on the face of the user by covering the left and right eyes of the user.

The goggle apparatus 10 includes an upper surface 11, a right side surface 12, a lower surface 13, a left side surface 14, and a bottom surface 15. The surfaces 11 to 15 form a goggle main body. Further, on the bottom surface 15 of the goggle apparatus 10, an approximately circular left opening 16L is provided at a position corresponding to the left eye of the user, and an approximately circular right opening 16R is provided at a position corresponding to the right eye of the user. A lens is fitted to each of the left opening 16L and the right opening 16R. Further, in an inner space surrounded by the surfaces 11 to 15 of the goggle apparatus 10, a partition surface 17 is provided that separates the inner space of the goggle apparatus 10 into left and right portions.

The goggle apparatus 10 includes a display section 21. Specifically, on the back side of the bottom surface 15 of the goggle main body, the information processing apparatus 2 including the display section 21 is provided. A part of the display section 21 of the information processing apparatus 2 provided on the back side of the bottom surface 15 is viewed by the user from the left opening 16L and the right opening 16R through lenses. As shown in FIG. 2, the display section 21 is a horizontally long and approximately rectangular display screen. A left area 21L surrounded by a dashed line on the left side of FIG. 2 is viewed by the left eye of the user through the lens provided in the left opening 16L, and a right area 21R surrounded by a dashed line on the right side is viewed by the right eye of the user through the lens provided in the right opening 16R. When the user holds the goggle apparatus 10 and puts the goggle apparatus 10 on their face, the left eye of the user is almost surrounded by the upper surface 11, the lower surface 13, the left side surface 14, and the partition surface 17, and the right eye of the user is almost surrounded by the upper surface 11, the lower surface 13, the right side surface 12, and the partition surface 17. Thus, a left eye image displayed in the left area 21L of the display section 21 is viewed by the left eye of the user, while the surrounding environment and a right eye image displayed in the right area 21R are difficult for the left eye to view. The right eye image displayed in the right area 21R of the display section 21 is viewed by the right eye of the user, while the surrounding environment and the left eye image displayed in the left area 21L are difficult for the right eye to view.

The goggle main body and the display section 21 form the goggle apparatus 10. The information processing apparatus 2 including the display section 21 is detachably attached to the goggle main body. As the information processing apparatus 2 attachable to and detachable from the goggle main body, a tablet terminal, a smartphone, a mobile game apparatus, or the like may be used.

Although the details will be described below, the information processing apparatus 2 generates a left eye image obtained by viewing a virtual space from a left virtual camera, and a right eye image obtained by viewing the virtual space from the right virtual camera. The information processing apparatus 2 displays the generated left eye image and right eye image in the left area 21L and the right area 21R, respectively, of the display section 21. This enables the user to view a stereoscopic image and experience virtual reality (VR) as if the user themselves was present in the virtual space.

Figure 3:
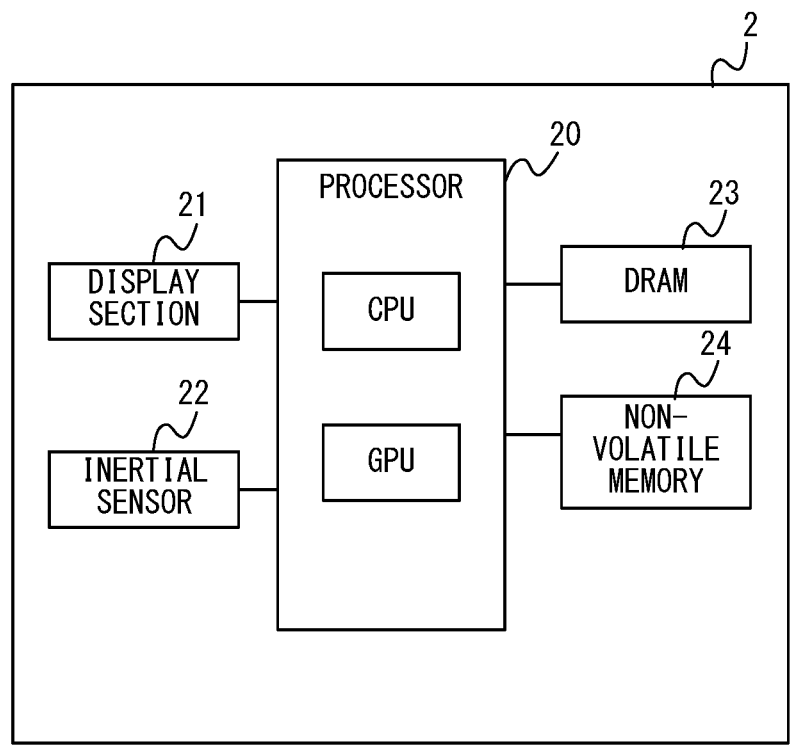
FIG. 3 is a diagram showing an example non-limiting functional configuration of the information processing apparatus 2.

FIG. 3 is a diagram showing an example of the functional configuration of the information processing apparatus 2. As shown in FIG. 3, the information processing apparatus 2 includes a processor 20, an inertial sensor 22, a DRAM 23, and a non-volatile memory 24 in addition to the display section 21. The processor 20 includes a CPU and a GPU. The CPU cooperates with the DRAM 23 to perform a process described below, and the GPU generates images (a left eye image and a right eye image) according to a command from the CPU. The generated left eye image and right eye image are displayed in the left area 21L and the right area 21R, respectively, of the display section 21. The CPU and the GPU may be mounted on different chips, or may be mounted as an SoC (System-on-a-chip) on a single chip.

The inertial sensor 22 is a sensor for detecting the orientation of the information processing apparatus 2. Specifically, the inertial sensor 22 includes an angular velocity sensor and an acceleration sensor. The angular velocity sensor detects angular velocities about predetermined three axes (e.g., XYZ axes shown in FIG. 2). The acceleration sensor detects accelerations about predetermined three axes (e.g., the XYZ axes shown in FIG. 2).

The non-volatile memory 24 is a storage device that stores a program for performing a process described below. The non-volatile memory 24 may be, for example, a flash memory. The non-volatile memory 24 may be any storage device such as a magnetic disk or an optical disc.

Figure 4:
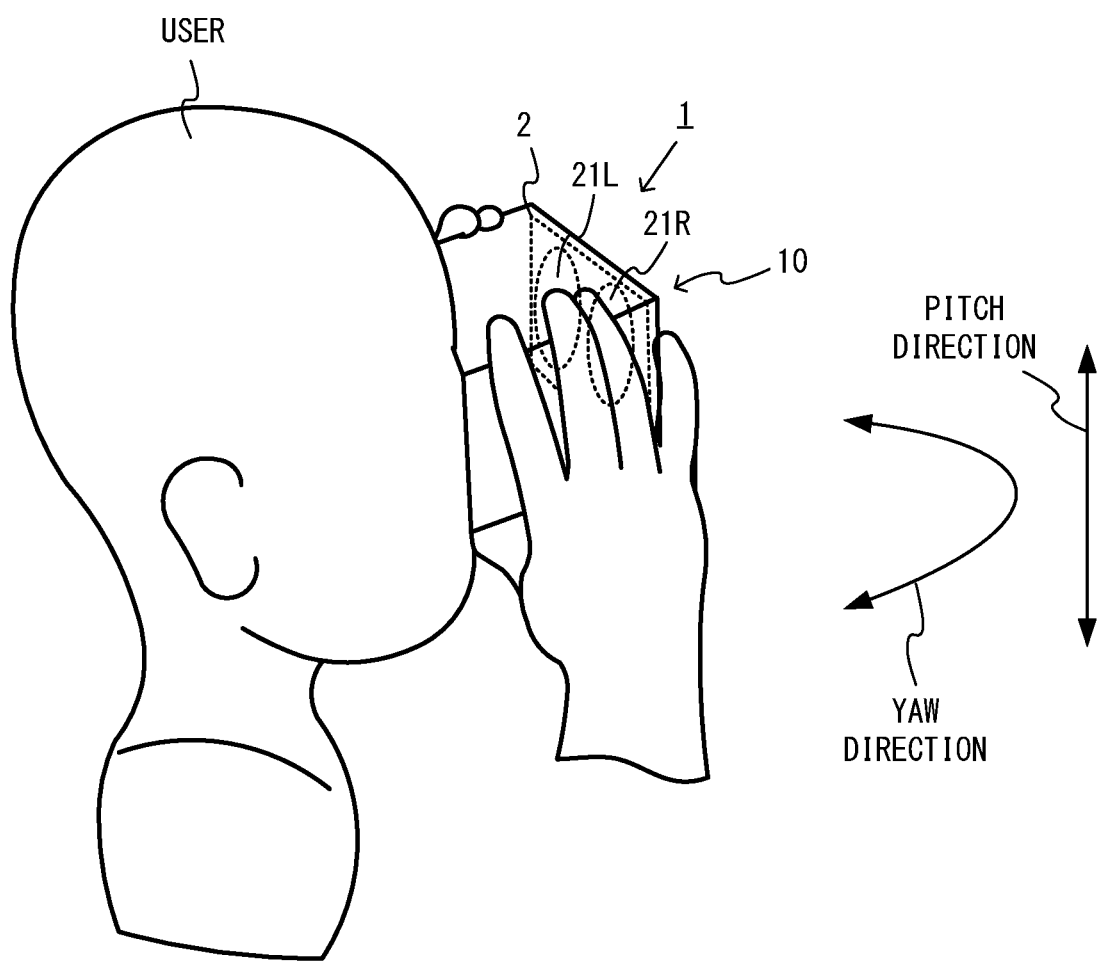
FIG. 4 is a diagram showing an example non-limiting state where a user uses a goggle apparatus 10.

FIG. 4 is a diagram showing the state where the user uses the goggle apparatus 10. As shown in FIG. 4, the user looks into the display section 21 by holding the goggle apparatus 10 to which the information processing apparatus 2 is attached. If the user directs their face or the entirety of their body in a left-right direction (the horizontal direction or a "yaw direction") or an up-down direction (the vertical direction or a "pitch direction") in this state, the orientation of the goggle apparatus 10 (the information processing apparatus 2) changes from a reference orientation. The reference orientation is, for example, the orientation of the goggle apparatus 10 when the user faces the front. For example, the reference orientation may be the orientation in which a down direction (a negative Y-axis direction in FIG. 2) along the display section 21 (the bottom surface 15) of the goggle apparatus 10 is parallel to the direction of gravity.

Based on angular velocity values and/or acceleration values detected by the inertial sensor 22, the information processing apparatus 2 calculates the orientation of the information processing apparatus 2 (the goggle apparatus 10). In accordance with the orientation of the information processing apparatus 2 (the goggle apparatus 10) in real space, the orientations of the left virtual camera and the right virtual camera in the virtual space are controlled.

In the virtual space, a virtual object is placed, and the user can view a stereoscopic image of the virtual space including the virtual object. In the exemplary embodiment, in the virtual space, a user interface (UI) object is placed as an example of the virtual object.

Figure 5:
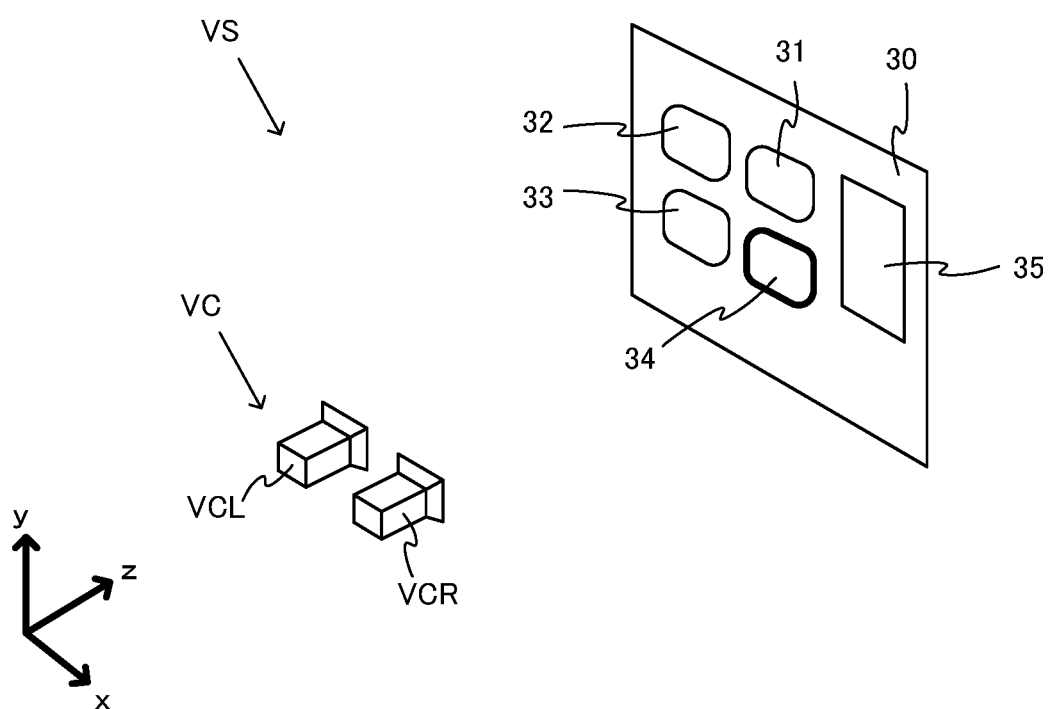
FIG. 5 is a diagram showing an example non-limiting virtual space VS.

FIG. 5 is a diagram showing an example of a virtual space VS. As shown in FIG. 5, in a virtual space VS, an xyz orthogonal coordinate system is set. An x-axis is an axis in a horizontal direction in the virtual space VS. A y-axis is an axis in a height direction in the virtual space VS. A z-axis is an axis perpendicular to the x-axis and the y-axis and is also an axis in a depth direction in the virtual space.

In the virtual space VS, a left virtual camera VCL and a right virtual camera VCR are placed. The left virtual camera VCL and the right virtual camera VCR are placed in the virtual space at a distance similar to the distance between the left and right eyes of an average user. A left eye image and a right eye image obtained by viewing the virtual space from the left virtual camera VCL and the right virtual camera VCR are viewed by the left eye and the right eye, respectively, of the user, whereby the user views a stereoscopic image of the virtual space. Hereinafter, the left virtual camera VCL and the right virtual camera VCR will occasionally be collectively referred to as a "virtual camera VC".

In the virtual space VS, a UI object 30 is placed. The UI object 30 is a virtual object that is operated by the user and displays information to be presented to the user. For example, the UI object 30 provides a menu function to the user. For example, the UI object 30 is displayed during the execution of a predetermined game application, and the user can perform a predetermined operation in a game using the UI object 30. The UI object 30 is, for example, a plate-like object and is placed at a position at a predetermined height in the virtual space and in the orientation in which the UI object 30 is perpendicular to an xz plane.

The UI object 30 includes icons 31 to 34 that can be selected by the user. For example, the icon 34 selected by the user may be displayed in a different form from those of the other icons. The user selects any of the icons 31 to 34 by any method. For example, when a pointer 37 (see FIG. 7A) is displayed at a predetermined position in a stereoscopic image (e.g., the center of the image) displayed on the display section 21, and the pointer is present in the display area of an icon, the icon may be processed on the assumption that the icon is selected by the user. In this case, to select a desired icon, the user changes the orientation of the goggle apparatus 10 so that the pointer enters the display area of the desired icon. For example, using a handheld operation apparatus connected to the information processing apparatus 2 in a wireless or wired manner, the user may control the position of the pointer displayed in the stereoscopic image. For example, the operation apparatus may include a direction indication section that allows the user to indicate a direction (e.g., an analog stick, a directional pad, a button, or the like), and based on an operation on the direction indication section, the position of the pointer may be controlled.

Each icon may be, for example, an icon for determining an operation in the game, or may be an icon for using a predetermined item. Each icon may be an icon for performing an operation on a menu screen provided by the UI object 30 (e.g., the operation of returning to the previous screen, or the operation of making a determination). Each icon may be an icon for selecting and starting a predetermined application.

The UI object 30 includes an information display object 35. The information display object 35 is an object for providing information to the user, using a character, an image, or the like.

In the virtual space, not only a game but also any other activity may be performed. For example, a particular work (e.g., the work of flying an airplane or driving a vehicle) may be simulated. The function of each icon included in the UI object 30 (an operation performed using the UI object 30) differs depending on the activity performed in the virtual space.

(Control of Movement of UI Object 30)

Next, a description is given of control of the UI object 30 when the user directs the bottom surface 15 of the goggle apparatus 10 in the left-right direction (the yaw direction) or the up-down direction (the pitch direction) while viewing the display section 21 of the goggle apparatus 10.

Figure 6A:
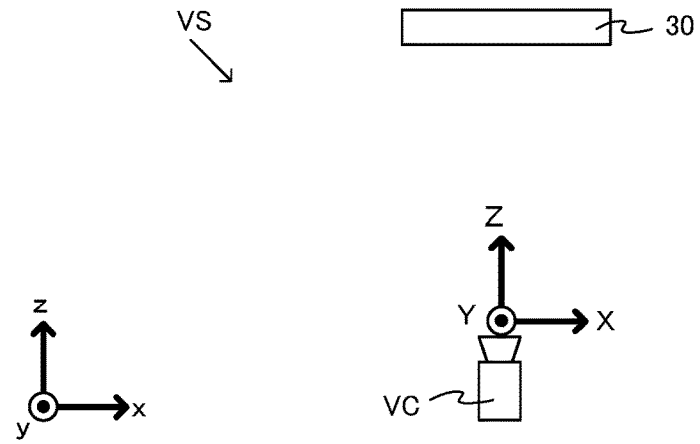
FIG. 6A is a diagram showing an example non-limiting virtual space viewed from above when the goggle apparatus 10 is maintained in a reference orientation.
Figure 6B:
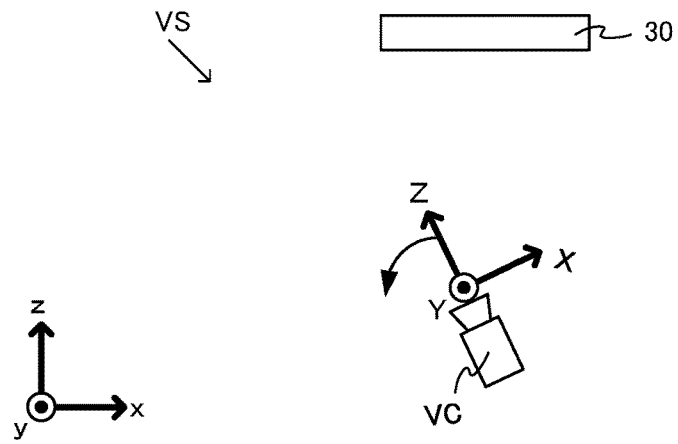
FIG. 6B is a diagram showing an example non-limiting virtual space viewed from above when the goggle apparatus 10 is rotated in a yaw direction (a left direction) from the reference orientation.
Figure 6C:
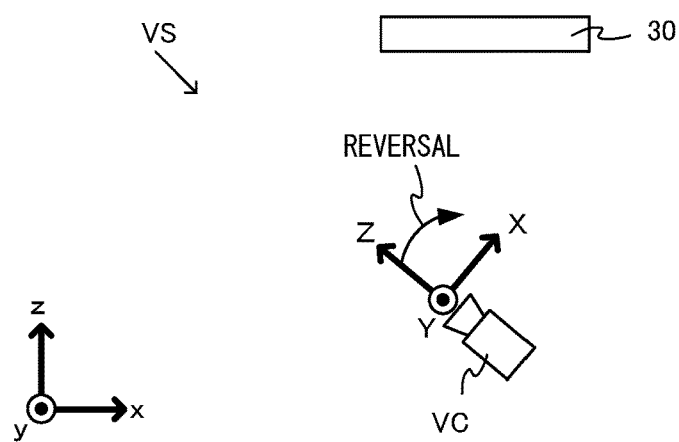
FIG. 6C is a diagram showing an example non-limiting virtual space viewed from above when the goggle apparatus 10 is further rotated in the yaw direction (the left direction) from the state in FIG. 6B.

FIG. 6A is a diagram showing the virtual space viewed from above when the goggle apparatus 10 is maintained in the reference orientation. FIG. 6B is a diagram showing the virtual space viewed from above when the goggle apparatus 10 is rotated in the yaw direction (the left direction) from the reference orientation. FIG. 6C is a diagram showing the virtual space viewed from above when the goggle apparatus 10 is further rotated in the yaw direction (the left direction) from the state in FIG. 6B.

Figure 7A:
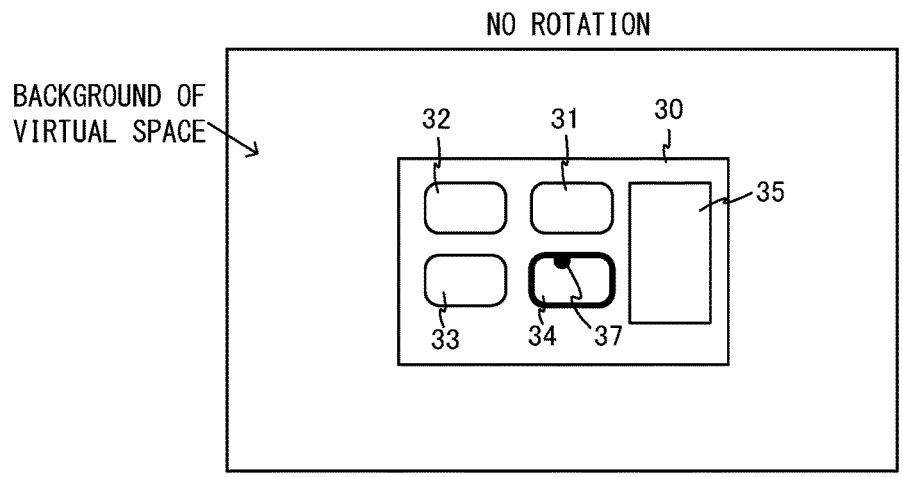
FIG. 7A is a diagram showing an example non-limiting image viewed by the user, and also an example non-limiting image of the virtual space viewed from a virtual camera VC (VCL or VCR) in the orientation shown in FIG. 6A.
Figure 7B:
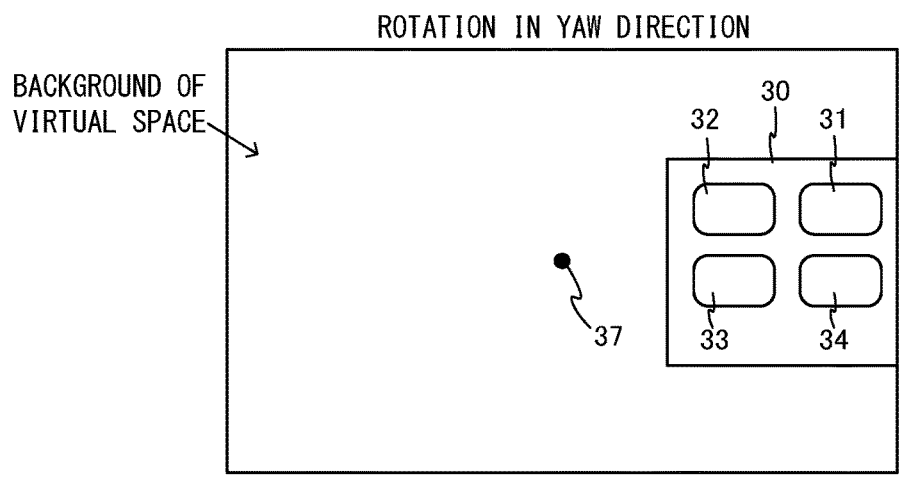
FIG. 7B is a diagram showing an example non-limiting image viewed by the user, and also an example non-limiting image of the virtual space viewed from the virtual camera VC in the orientation shown in FIG. 6B.
Figure 7C:
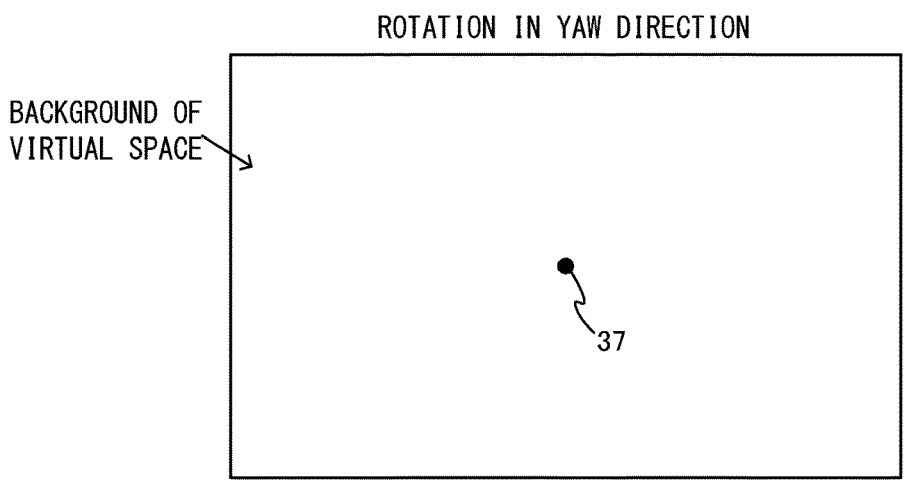
FIG. 7C is a diagram showing an example non-limiting image viewed by the user, and also an example non-limiting image of the virtual space viewed from a virtual camera VC in the orientation shown in FIG. 6C.

FIG. 7A is a diagram showing an example of an image viewed by the user, and also an example of an image of the virtual space viewed from the virtual camera VC (VCL or VCR) in the orientation shown in FIG. 6A. FIG. 7B is a diagram showing an example of an image viewed by the user, and also an example of an image of the virtual space viewed from the virtual camera VC in the orientation shown in FIG. 6B. FIG. 7C is a diagram showing an example of an image viewed by the user, and also an example of an image of the virtual space viewed from the virtual camera VC in the orientation shown in FIG. 6C. Although FIGS. 7A to 7C show planar rectangular images, the images shown in FIGS. 7A to 7C are actually stereoscopic images and approximately circular similarly to the left area 21L and the right area 21R.

In the virtual camera VC, a camera coordinate system (an XYZ coordinate system) fixed to the virtual camera VC is set. An X-axis is an axis in a right direction of the virtual camera VC, a Y-axis is an axis in an up direction of the virtual camera VC, and a Z-axis is an axis in the direction of the line of sight of the virtual camera VC. As shown in FIG. 6A, when the goggle apparatus 10 (the information processing apparatus 2) is maintained in the reference orientation, the virtual camera VC is directed to the UI object 30.

In a state as shown in FIG. 6A, an image as shown in FIG. 7A is displayed on the display section 21. The user views a left eye image and a right eye image displayed on the display section 21, thereby viewing a stereoscopic image as shown in FIG. 7A. As shown in FIG. 7A, the UI object 30 is displayed at the front, and the background of the virtual space is displayed behind the UI object 30. For example, a pointer 37 is set and displayed at the position of the center of the stereoscopic image. The user controls the orientation of the goggle apparatus 10 so that the pointer 37 is located in the display area of the UI object 30. Then, using the pointer 37, the user selects the icons 31 to 34 that can be selected in the UI object 30. The pointer 37 may not be displayed on the screen, and may be internally set in the information processing apparatus 2.

If the goggle apparatus 10 is rotated in the yaw direction (e.g., the left direction) in real space, as shown in FIG. 6B, the virtual camera VC also rotates in the yaw direction (e.g., the left direction) in the virtual space. At this time, an image as shown in FIG. 7B is displayed. Specifically, when the goggle apparatus 10 is rotated in the left direction, the UI object 30 is displayed located to the right side of the front, and a part of the UI object 30 is no longer displayed.

If the goggle apparatus 10 is further rotated in the left direction from the state shown in FIG. 6B, as shown in FIG. 6C, the virtual camera VC further rotates in the left direction. At this time, an image as shown in FIG. 7C is displayed on the display section 21. Specifically, when the goggle apparatus 10 is further rotated in the left direction from the state shown in FIG. 6B without reversing the goggle apparatus 10 in the right direction, the UI object 30 comes out of the image capturing range of the virtual camera VC and is no longer displayed. In this case, the background of the virtual space except for the UI object 30 is displayed.

If the user further rotates the goggle apparatus 10 in the left direction from the state in shown in FIG. 6C and thereby can view the virtual space further in the left direction.

Here, for example, when the user reverses the goggle apparatus 10 by a predetermined angle in the right direction in the orientation shown in FIG. 6C, the UI object 30 moves so that the UI object 30 is located in front of the virtual camera VC.

Figure 8:
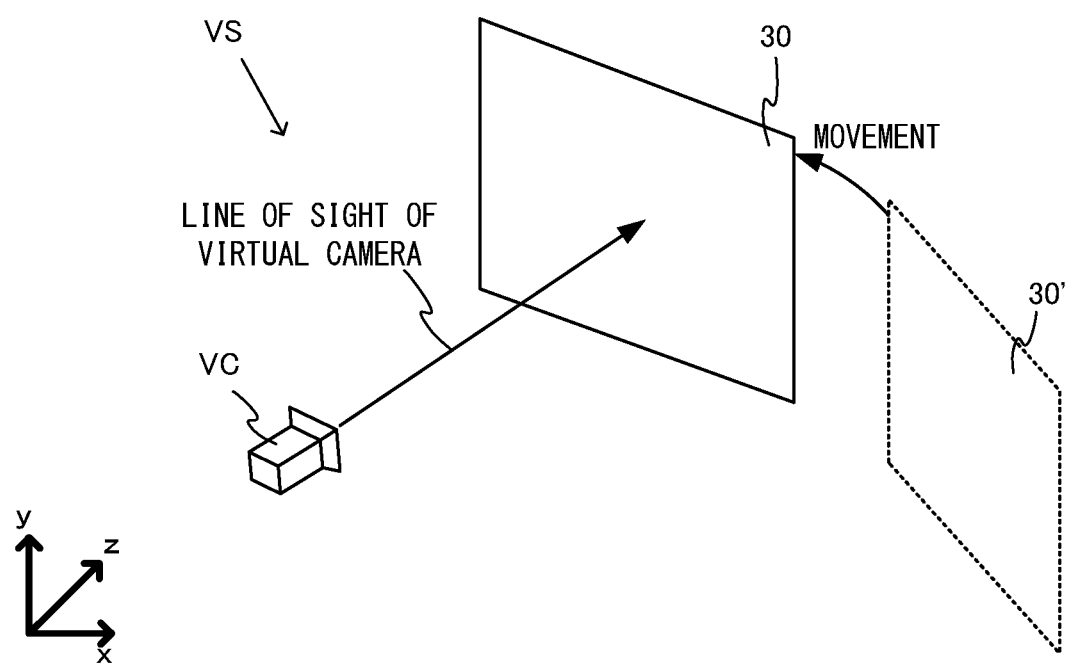
FIG. 8 is a diagram showing an example non-limiting state where a UI object 30 moves to the front of the virtual camera VC when the goggle apparatus 10 is reversed by a predetermined angle in the right direction in the orientation shown in FIG. 6C.

FIG. 8 is a diagram showing the state where the UI object 30 moves to the front of the virtual camera VC when the goggle apparatus 10 is reversed by the predetermined angle in the right direction in the orientation shown in FIG. 6C. In FIG. 8, 30' indicated by a dashed line represents the UI object before the movement, and 30 indicated by a solid line represents the UI object after the movement.

As shown in FIG. 8, for example, when the goggle apparatus 10 reverses by the predetermined angle in the right direction from the state where the goggle apparatus 10 is rotated in the left direction, the UI object 30 moves to the front (the front in the left-right direction) of the virtual camera VC. For example, the UI object 30 moves in the left direction along a circle centered at an intermediate position between the left virtual camera VCL and the right virtual camera VCR while changing its direction. That is, the UI object 30 moves in the left direction on a plane parallel to the xz plane while maintaining the distance from the virtual camera VC. The UI object 30 moves while changing its direction so that the UI object 30 is directed to the virtual camera VC. Thus, when the virtual camera VC does not rotate in the pitch direction in the virtual space, the line of sight of the virtual camera VC is perpendicular to the UI object 30 after the movement. If the UI object 30 moves to the front of the virtual camera VC, a stereoscopic image as shown in FIG. 7A is displayed on the display section 21.

The UI object 30 moves by a predetermined distance per frame time (e.g., 1/60 seconds). Thus, for example, when the UI object 30 reverses by the predetermined angle in the right direction from the state where the goggle apparatus 10 is rotated in the left direction, the UI object 30 does not instantaneously move to the front of the virtual camera VC, but spends some time (e.g., several frame times to several tens of frame times) moving. The UI object 30 may be instantaneously (in one frame time) moved to the front of the virtual camera VC.

Even when a part of the UI object 30 is displayed and the other part is not displayed as shown in FIG. 7B, and if the goggle apparatus 10 reverses by the predetermined angle in the right direction, the UI object 30 may be moved to the front of the virtual camera VC. Even when the UI object 30 is displayed at the end of the screen and the entirety of the UI object 30 is displayed, and if the goggle apparatus 10 reverses by the predetermined angle in the right direction, the UI object 30 may be moved to the front of the virtual camera VC.

When the pointer 37 is located in the display area of the UI object 30, the UI object 30 may not be moved. In a case where the pointer 37 is not located in the display area of the UI object 30, and when the goggle apparatus 10 reverses by the predetermined angle, the UI object 30 may be moved.

As described above, in the exemplary embodiment, the UI object 30 is not moved to the front of the virtual camera VC only by the virtual camera VC rotating in one direction (e.g., the left direction) in the yaw direction and, for example, the UI object 30 coming out of the image capturing range of the virtual camera VC. After the virtual camera VC rotates in one direction (e.g., the left direction) in the yaw direction, and when the virtual camera VC rotates (reverses) by the predetermined angle in the other direction (e.g., the right direction) in the yaw direction, the UI object 30 is moved to the front of the virtual camera VC. The movement of the UI object 30 will be described in detail below.

(Details of Movement of UI Object 30)

Figure 9:
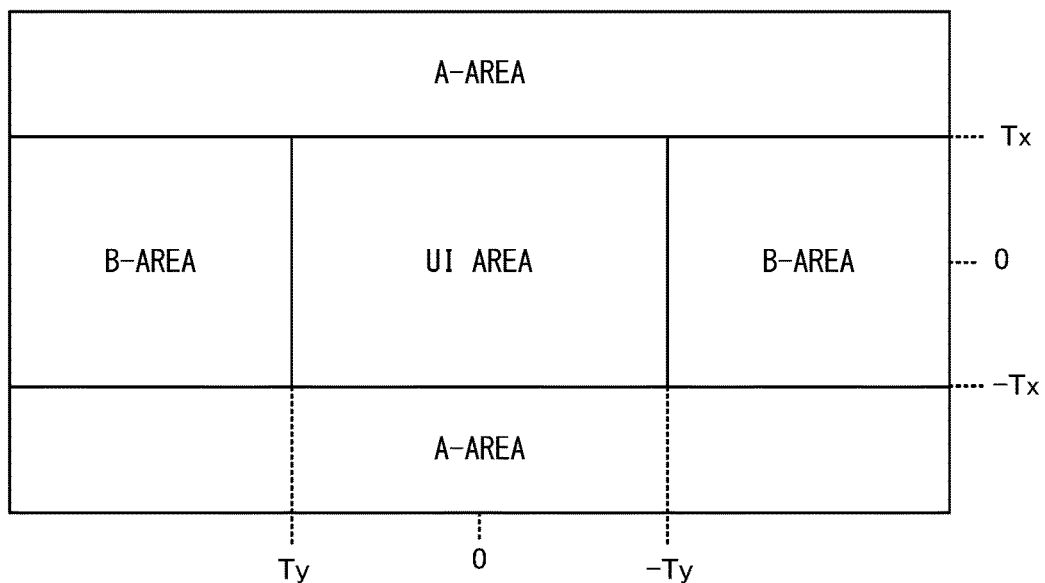
FIG. 9 is a diagram showing example non-limiting areas to which the UI object 30 is moved.

FIG. 9 is a diagram showing examples of areas to which the UI object 30 is moved. FIG. 9 shows a diagram where the virtual space is conceptually divided into a plurality of areas based on the virtual camera VC when the UI object 30 is located in front of the virtual camera VC.

In the exemplary embodiment, a process regarding the movement of the UI object 30 differs depending on which of a "UI area", a "B-area", and an "A-area" shown in FIG. 9 the line of sight of the virtual camera VC is present in.

When the line of sight of the virtual camera VC is present in the "UI area" shown in FIG. 9, the UI object 30 is displayed on the display section 21, and the UI object 30 does not move in the virtual space in accordance with a change in the orientation of the goggle apparatus 10. The "UI area" is an area based on the UI object 30 and is also an area corresponding to the UI object 30. Specifically, when the UI object 30 is located in front of the virtual camera VC (front in the left-right direction and the up-down direction), the angle of the line of sight of the virtual camera VC is defined as 0 degrees. When the rotational angles of the line of sight of the virtual camera VC in the yaw direction and the pitch direction in the virtual space are less than or equal to a predetermined threshold, it is determined that the line of sight of the virtual camera VC is present in the "UI area" shown in FIG. 9. More specifically, when the absolute value of the rotational angle of the line of sight of the virtual camera VC in the yaw direction is less than a first threshold (Ty), and the absolute value of the rotational angle of the line of sight of the virtual camera VC in the pitch direction is less than a second threshold (Tx), it is determined that the line of sight of the virtual camera VC is present in the "UI area" shown in FIG. 9.

Here, the UI area is determined based on the first threshold and the second threshold. For example, the UI area may coincide with the display area of the UI object 30. In this case, for example, when the rotational angle of the line of sight of the virtual camera VC in the yaw direction reaches the first threshold (Ty), as shown in FIG. 7C, the entirety of the UI object 30 is no longer displayed. The UI area may be smaller than the display area of the UI object 30. In this case, when the rotational angle of the line of sight of the virtual camera VC in the yaw direction is the first threshold (Ty), for example, as shown in FIG. 7B, a part of the UI object 30 is displayed. Even when the rotational angle of the line of sight of the virtual camera VC in the yaw direction is the first threshold (Ty), the entirety of the UI object 30 may be displayed. The UI area determined based on the first threshold and the second threshold may be larger than the display area of the UI object 30.

The UI area may be such an area that the pointer 37 in a stereoscopic image is located in the display area of the UI object 30. That is, the UI area may be an area that, when the pointer 37 moves along the outer periphery of the display area of the UI object 30, is formed by the trajectory of the movement.

Figure 10:
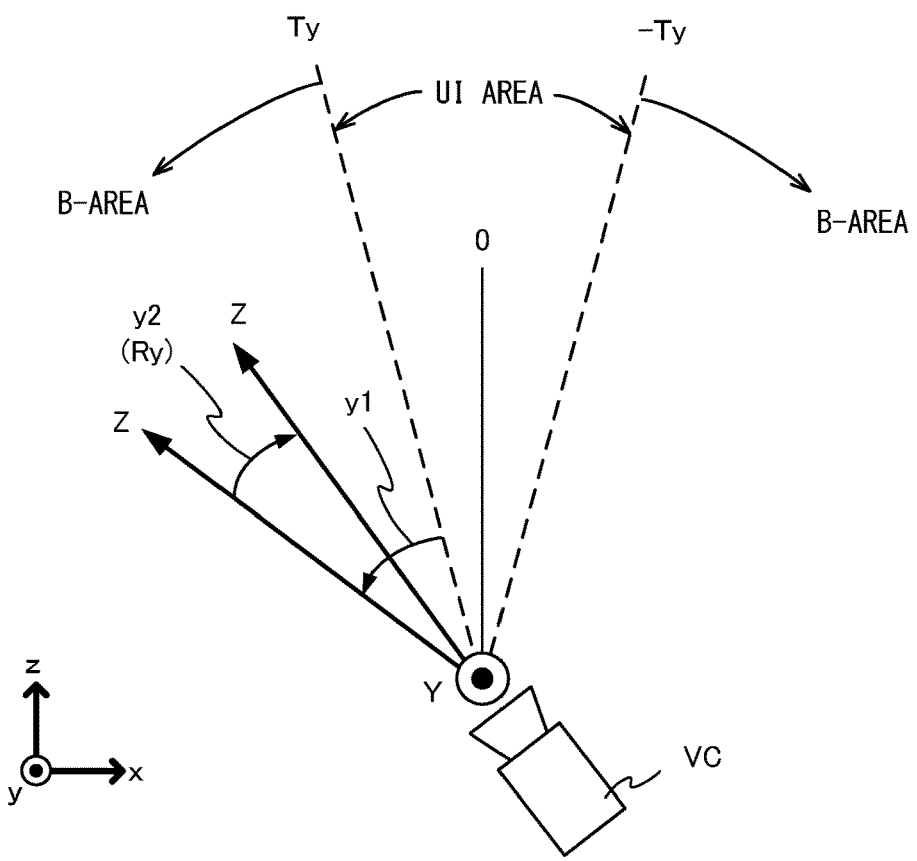
FIG. 10 is a diagram showing an example non-limiting virtual camera VC viewed from above the virtual space and is also a diagram showing an example non-limiting state where the virtual camera VC is rotated in the left direction and then rotated in the right direction.
Figure 11:
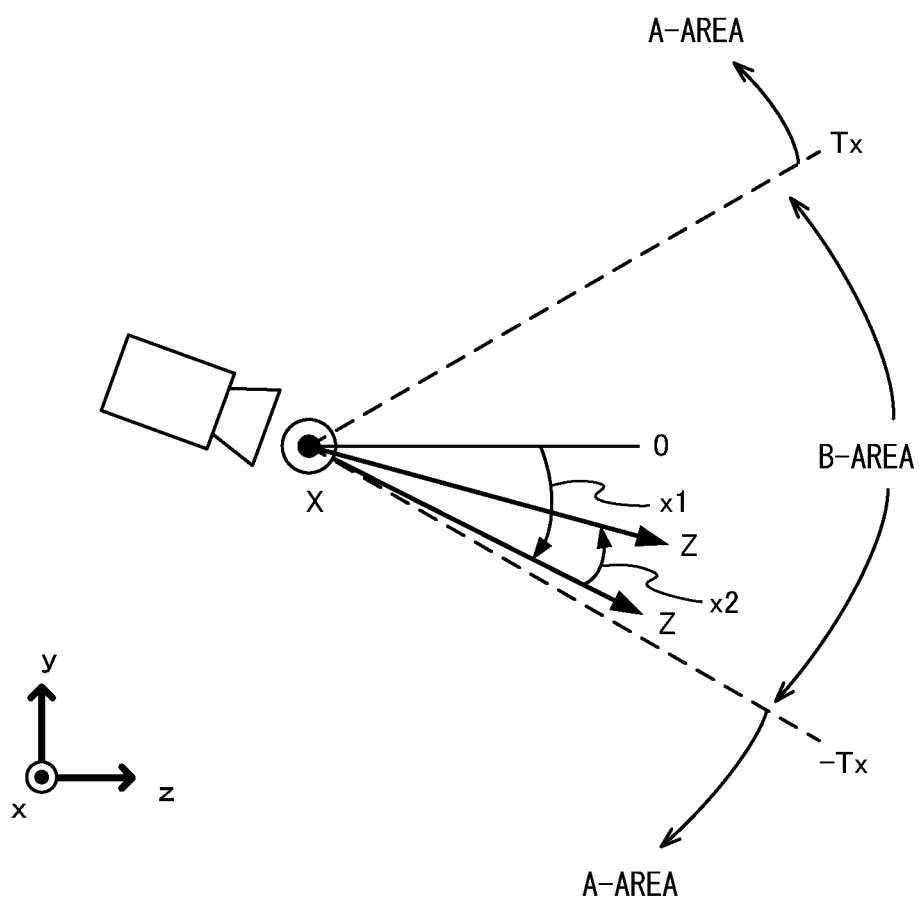
FIG. 11 is a diagram showing an example non-limiting virtual camera VC viewed from the horizontal direction in the virtual space and is also a diagram showing an example non-limiting state where the virtual camera VC is rotated in the down direction and then rotated in the up direction.

When the line of sight of the virtual camera VC is present in the B-area shown in FIG. 9, a "movement process in the B-area" is performed. That is, when the absolute value of the rotational angle of the line of sight of the virtual camera VC in the yaw direction is greater than or equal to the first threshold (Ty), and the absolute value of the rotational angle of the line of sight of the virtual camera VC in the pitch direction is less than the second threshold (Tx), the "movement process in the B-area" is performed. In the "movement process in the B-area", "the determination of whether or not the UI object 30 is to be moved" is made. With reference to FIGS. 10 and 11, this determination is specifically described below.

FIG. 10 is a diagram showing the virtual camera VC viewed from above the virtual space and is also a diagram showing an example of the state where the virtual camera VC is rotated in the left direction and then rotated in the right direction. FIG. 11 is a diagram showing the virtual camera VC viewed from the horizontal direction in the virtual space and is also a diagram showing an example of the state where the virtual camera VC is rotated in the down direction and then rotated in the up direction.

As shown in FIG. 10, for example, when the line of sight of the virtual camera VC rotates by exceeding the first threshold "Ty" in the left direction (a positive direction) in the yaw direction, the line of sight of the virtual camera VC enters the B-area. After the line of sight of the virtual camera VC enters the B-area, the amount of change "y1" in the left direction and the amount of change "y2" in the right direction are calculated. The amount of change "y1" in the left direction and the amount of change "y2" in the right direction are the relative amount of rotation after the line of sight of the virtual camera VC enters the B-area. When the line of sight of the virtual camera repeatedly moves in the left direction and the right direction, each of the amount of change "y1" in the left direction and the amount of change "y2" in the right direction is accumulated. For example, after the line of sight of the virtual camera VC enters the B-area, and when the line of sight of the virtual camera VC rotates "10" degrees in the left direction, "2" degrees in the right direction, "5" degrees in the left direction, and "3" degrees in the right direction in this order, the accumulation value of the amount of change "y1" in the left direction is "10+5=15" degrees, and the accumulation value of the amount of change "y2" in the right direction is "2+3=5" degrees. The smaller value (the accumulation value of the amount of change y2 in the right direction) of the accumulation value of the amount of change "y1" in the left direction and the accumulation value of the amount of change "y2" in the right direction is stored as the amount of change Ry in the left-right direction. In this case, the accumulation value of the amount of change "y2" in the right direction, namely "5" degrees, is stored as the amount of change Ry in the left-right direction.

The same applies to rotation in the pitch direction. As shown in FIG. 11, after the line of sight of the virtual camera VC enters the B-area (i.e., after the line of sight of the virtual camera VC rotates by an angle greater than or equal to the first threshold in the yaw direction), the line of sight of the virtual camera VC rotates "x1" degrees in the down direction (a negative direction) in the pitch direction and then rotates "x2 (<x1)" degrees in the up direction.

FIG. 11 shows a case where the rotational angle in the pitch direction in the virtual space when the line of sight of the virtual camera VC enters the B-area is "0" degrees. There is also a case where, at the time when the line of sight of the virtual camera VC enters the B-area, the line of sight of the virtual camera VC rotates by a predetermined angle in the pitch direction in the virtual space. In this case, the amount of change in the down direction from the time when the line of sight of the virtual camera VC enters the B-area is "x1".

The smaller value (the accumulation value of the amount of change x2 in the up direction) of the accumulation value of the amount of change "x1" in the down direction and the accumulation value of the amount of change "x2" in the up direction is stored as the amount of change Rx in the up-down direction. For example, after the line of sight of the virtual camera VC enters the B-area, and when the line of sight of the virtual camera VC rotates "10" degrees in the down direction, "2" degrees in the up direction, "3" degrees in the down direction, and "1" degrees in the up direction in this order, the accumulation value of the amount of change "x1" in the down direction is "10+3=13" degrees, and the accumulation value of the amount of change "x2" in the up direction is "2+1=3" degrees. The smaller value (the accumulation value of the amount of change x2 in the up direction) of the accumulation value of the amount of change "x1" in the down direction and the accumulation value of the amount of change "x2" in the up direction is stored as the amount of change Rx in the up-down direction. In this case, the accumulation value of the amount of change "x2" in the up direction, namely "3" degrees, is stored as the amount of change Rx in the up-down direction.

Here, when the line of sight of the virtual camera VC continues to rotate in one direction (e.g., the left direction in the yaw direction) with respect to the yaw direction or the pitch direction, the amount of change in the other direction (e.g., the right direction in the yaw direction) is "0". Thus, when the smaller value of the accumulation values of the amount of rotation in the one direction and the amount of rotation in the other direction exceeds "0" degrees, the rotation of the line of sight of the virtual camera VC changes from the one direction to the other direction. In contrast, when the smaller value of the accumulation values of the amount of rotation in one direction and the amount of rotation in the other direction is "0" degrees, this means that the line of sight of the virtual camera continues to rotate in the one direction, or the line of sight of the virtual camera does not rotate.

Thus, in the exemplary embodiment, based on the smaller values Rx and Ry, it is detected whether or not the rotation of the line of sight of the virtual camera VC changes (i.e., reverses) from one direction to the other direction. When a change from one direction to the other direction is detected, the UI object 30 is moved to the front of the virtual camera VC.

Specifically, when the sum of the amount of change Ry in the left-right direction and the amount of change Rx in the up-down direction is greater than or equal to a predetermined value (e.g., "6" degrees), the UI object 30 is moved to the front of the virtual camera VC. On the other hand, when the sum is less than the predetermined value, the UI object 30 is not moved. For example, in a case where the line of sight of the virtual camera VC is present in the B-area, and when the line of sight of the virtual camera VC rotates "10 degrees in the left direction"→"3 degrees in the right direction"→"20 degrees in the left direction" in this order, the amount of change Ry in the left-right direction is "3" degrees, and the amount of change Rx in the up-down direction is "0" degrees. In this case, since "Rx+Ry" is less than the predetermined value, the UI object 30 is not moved to the front of the virtual camera VC.

On the other hand, in a case where the line of sight of the virtual camera VC is present in the B-area, and when the line of sight of the virtual camera VC rotates "10 degrees in the left direction"→"3 degrees in the right direction"→"20 degrees in the left direction"→"3 degrees in the right direction" in this order, the amount of change Ry in the left-right direction is "6" degrees. In this case, since "Rx+Ry" is greater than or equal to the predetermined value, the UI object 30 is moved to the front of the virtual camera VC. When the line of sight of the virtual camera VC rotates in an oblique direction, Rx and Ry described above are calculated by dividing the rotation direction into a component in the left-right direction (the yaw direction) and a component in the up-down direction (the pitch direction). For example, when the line of sight of the virtual camera VC rotates in the "left-up direction (10 degrees with the component in the left direction and 10 degrees with the component in the up direction)" and next rotates in the "right-down direction (3 degrees with the component in the right direction and 3 degrees with the component in the down direction)", Rx is "3" degrees, and Ry "3" degrees. In this case, "Rx+Ry" is greater than or equal to the predetermined value. Thus, the UI object 30 is moved to the front of the virtual camera VC.

As described above, in the "movement process in the B-area", it is detected that the virtual camera VC rotates in one direction in the yaw direction or the pitch direction and then rotates in the opposite direction. In a case where the virtual camera VC rotates in the opposite direction, and when a value obtained by accumulating the rotational angle in the opposite direction is greater than or equal to the predetermined value, the UI object 30 moves to the front of the virtual camera VC. That is, in a case where the line of sight of the virtual camera VC changes from one direction to the other direction in a predetermined rotation direction (the yaw direction or the pitch direction), and further, the rotational angle in the other direction is greater than or equal to the predetermined value, the UI object 30 is moved.

In a case where the line of sight of the virtual camera VC is present in the B-area, and even if "Rx+Ry" is less than the predetermined value, and when the user performs a predetermined operation, the UI object 30 may be moved to the front of the virtual camera VC. For example, when a predetermined button or place in the goggle apparatus 10 is pressed, tapped, or hit, the UI object 30 may be moved to the front of the virtual camera VC. For example, when the acceleration sensor of the inertial sensor 22 of the goggle apparatus 10 detects an acceleration value greater than or equal to a predetermined value, the UI object 30 may be moved to the front of the virtual camera VC.

Referring back to FIG. 9, when the line of sight of the virtual camera VC is present in the A-area, i.e., when the absolute value of the rotational angle of the line of sight of the virtual camera VC in the pitch direction exceeds the second threshold (Tx), a "movement process in the A-area" is performed. In the "movement process in the A-area", the above determination in the B-area is not made, and the UI object 30 is moved so that the UI object 30 is always located in front of the virtual camera VC with respect to the left-right direction. Here, when the angle of depression or the angle of elevation of the virtual camera VC (the goggle apparatus 10) exceeds the second threshold, the "movement process in the A-area" is performed. However, a threshold regarding the angle of depression and a threshold regarding the angle of elevation may not need to be the same value, and may be different from each other.

FIG. 12 is a diagram showing the state where the UI object 30 moves in a case where the line of sight of the virtual camera VC is present in the A-area.

In FIG. 12, 30' indicated by a dashed line represents the UI object before the movement, and 30 indicated by a solid line represents the UI object after the movement. As shown in FIG. 12, for example, when the line of sight of the virtual camera VC is present in the A-area above the UI object 30, the UI object 30 moves so that the UI object 30 is located in front of the virtual camera VC with respect to the left-right direction. The rotational angle of the virtual camera VC in the yaw direction (the left-right direction) based on the UI object 30 after the movement is "0" degrees. That is, based on the direction of the line of sight of the virtual camera VC, the UI object 30 after the movement is not shifted in the left-right direction. Thus, when the line of sight of the virtual camera VC is rotated in the down direction (when the virtual camera VC is rotated so that the rotational angle of the virtual camera VC in the pitch direction is "0" degrees), the UI object 30 is located in front of the virtual camera VC.

Here, a case is assumed where, after the line of sight of the virtual camera VC enters the B-area, the line of sight of the virtual camera VC enters the A-area without the UI object 30 moving by the "movement process in the B-area". In this case, when the line of sight of the virtual camera VC enters the A-area, the UI object 30 starts moving by the "movement process in the A-area". In this case, the UI object 30 may spend some time (e.g., several frame times to several tens of frame times) moving or instantaneously (in one frame time) move to the front of the virtual camera VC with respect to the left-right direction.

When the line of sight of the virtual camera VC enters the A-area from the state where the line of sight of the virtual camera VC is present in the "UI area", the UI object 30 moves by the "movement process in the A-area". When the line of sight of the virtual camera VC is present in the A-area, and if the virtual camera VC rotates in the left-right direction, the UI object 30 moves in accordance with the rotation of the virtual camera VC in the left-right direction. That is, while the virtual camera rotates in the left-right direction, the UI object 30 always moves following the rotation of the virtual camera in the left-right direction.

FIG. 13A is a diagram showing an example of an image displayed on the display section 21 in a case where the line of sight of the virtual camera VC rotates in the down direction and enters the A-area. FIG. 13B is a diagram showing an example of an image displayed on the display section 21 when the virtual camera VC rotates in the left direction from the state in FIG. 13A.

As shown in FIG. 13A, when the line of sight of the virtual camera VC rotates in the down direction (i.e., when the goggle apparatus 10 rotates in the down direction), a part of the lower side of the UI object 30 is displayed in an upper area of the screen. The UI object 30 is displayed at the center of the screen with respect to the left-right direction. In the background of the virtual space, for example, a virtual object 40 is present. The virtual object 40 is displayed at the left end of the screen.

When the line of sight of the virtual camera VC rotates in the left direction in this state (i.e., when the goggle apparatus 10 rotates in the left direction), as shown in FIG. 13B, the position of the UI object 30 in the left-right direction does not change. This is because the UI object 30 moves in the virtual space in accordance with the rotation of the virtual camera VC in the yaw direction by the above movement process in the A-area. Meanwhile, the virtual object 40 present in the background of the virtual space is displayed on the right side of its position in FIG. 13A. While the user continues to rotate the goggle apparatus 10 in the left direction, the position of the UI object 30 on the screen does not change, and the background of the virtual space moves in the right direction.

The sizes and the shapes of the "UI area", the "A-area", and the "B-area" shown in FIG. 9 may differ in accordance with the size and the shape of the UI object 30 to be displayed. The UI object 30 may be of a plurality of types, and the size and the shape of each area may differ in accordance with the type of the UI object 30. The size and the shape of each area may differ in accordance with the scene of the virtual space (the scene of the background). In this case, the first threshold (Ty) and the second threshold (Tx) described above differ in accordance with the size and the shape of each area. The size of the "UI area" may not necessarily need to match the size of the UI object 30. For example, there may be a margin around the UI object 30, and an area including an area where the UI object 30 is displayed and the margin around the UI object 30 may be set as the "UI area". Conversely, the "UI area" may be smaller than the area where the UI object 30 is displayed.

As described above, in the exemplary embodiment, when the rotational angles of the virtual camera VC in the yaw direction and the pitch direction (the rotational angles of the goggle apparatus 10 in the yaw direction and the pitch direction) in the virtual space exceed the predetermined threshold, a movement process for moving the UI object 30 is performed.

Specifically, when the absolute value of the rotational angle of the virtual camera VC in the yaw direction in the virtual space is greater than the first threshold (Ty), and the absolute value of the rotational angle in the pitch direction is smaller than the second threshold (Tx) (when the line of sight of the virtual camera VC is present in the B-area), the "movement process in the B-area" is performed. In the "movement process in the B-area", based on the rotational angles of the virtual camera VC in the yaw direction and the pitch direction, the determination of whether or not the UI object 30 is to be moved is made. Specifically, when the rotation of the virtual camera VC in the yaw direction changes from one direction to the other direction, the value Ry obtained by accumulating the rotational angle in the other direction is calculated. When the rotation of the virtual camera VC in the pitch direction changes from one direction to the other direction, the value Rx obtained by accumulating the rotational angle in the other direction is calculated. Then, the total of Rx and Ry is greater than or equal to the predetermined value, it is determined that the UI object 30 is to be moved. Then, the UI object 30 is moved to the front of the virtual camera VC.

The user may wish to view the UI object 30 in the virtual space, or may wish to view an object in a portion of the virtual space (the background or another object in the virtual space) different from a portion of the virtual space where the UI object 30 is located. When the line of sight of the virtual camera VC (the orientation of the goggle apparatus 10) continues to rotate in one direction, it is considered that the user wishes to view the portion of the virtual space different from the portion of the virtual space where the UI object 30 is located. Thus, in the exemplary embodiment, when the line of sight of the virtual camera VC continues to rotate in one direction (e.g., the left direction with respect to the yaw direction, or the up direction with respect to the pitch direction) or is at rest, the UI object 30 is not moved to the front of the virtual camera VC. Thus, the user continues to rotate the goggle apparatus 10, for example, in the left direction and thereby can look over the portion of the virtual space other than the portion of the virtual space where the UI object 30 is located.

On the other hand, when the line of sight of the virtual camera VC reverses from a direction away from the UI object 30 to a direction toward the UI object 30, there is a possibility that the user wishes to view the UI object 30 rather than another object in the virtual space. Thus, in the exemplary embodiment, in a case where the line of sight of the virtual camera VC reverses from one direction (a direction away from the UI object 30) to the other direction, and further, when the amount of rotation in the other direction becomes greater than or equal to a predetermined value, the UI object 30 is moved to the front of the virtual camera VC.

By performing such control, in the exemplary embodiment, it is possible to allow the user to view a portion of the virtual space different from a portion of the virtual space where the UI object 30 is located, and also move the UI object 30 present in the virtual space to the front so that the UI object 30 is easily operated (viewed).

For example, it is possible that at the time when the virtual camera VC is directed in a direction different from that of the UI object 30, and the UI object 30 comes out of the image capturing range of the virtual camera VC, the UI object 30 is moved to the front of the virtual camera VC. In this case, however, at the time when the UI object 30 comes out of the image capturing range of the virtual camera VC, the UI object 30 moves to the front of the user. Thus, the user cannot view the portion of the virtual space other than the portion of the virtual space where the UI object 30 is located.

In contrast, in the exemplary embodiment, when the goggle apparatus 10 continues to be rotated in one direction (a direction away from the UI object 30) in the yaw direction or is at rest, the UI object 30 does not move to the front of the virtual camera VC. Thus, the user can view the portion of the virtual space other than the portion of the virtual space where the UI object 30 is located. If the user wishes to view or operate the UI object 30 when looking over the virtual space, for example, the user reverses the goggle apparatus 10 to the other direction in the yaw direction or swings up and down the goggle apparatus 10, and thereby can move the UI object 30 to the front of the user. Consequently, for example, it is possible to easily select an icon in the UI object 30 using a pointer and improve the operability of the UI object 30 in a VR space. In a case where at least a part of the UI object 30 is displayed, and even when the UI object 30 is displayed at the end of the screen, it is possible to move the UI object 30 to the front by merely reversing the goggle apparatus 10 by a predetermined angle. Thus, it is possible to improve the operability.

In the exemplary embodiment, the UI object 30 is moved in the virtual space. Thus, it may be possible to reduce VR sickness.

In the exemplary embodiment, when the rotational angle of the virtual camera VC in the pitch direction in the virtual space is greater than the second threshold (Tx) (when the line of sight of the virtual camera VC is present in the A-area), the "movement process in the A-area" is performed. In the "movement process in the A-area", in accordance with the rotation of the virtual camera VC in the yaw direction, the UI object 30 always moves to the front of the virtual camera VC (the front with respect to the left-right direction). Thus, after the line of sight of the virtual camera VC enters the A-area, and when the user views the display section 21 with the goggle apparatus 10 in the reference orientation, the UI object 30 is always located in front of the user. For example, after the user places the goggle apparatus 10 on a surface in real space (a surface parallel to the ground, e.g., a table) so that the bottom surface 15 of the goggle apparatus 10 faces down or up, and when the user views the display section 21 again by holding the goggle apparatus 10, the UI object 30 always seems to be located in front of the user.

For example, it is assumed that two users experience VR using a single goggle apparatus 10. One of the users experiences VR using the goggle apparatus 10 and then passes the goggle apparatus 10 to the other user. At this time, the orientation of the goggle apparatus 10 changes, for example, so that the bottom surface 15 faces down. In this case, if the UI object 30 does not move by the above movement process in the A-area, and when the other user views the display section 21 by holding the goggle apparatus 10, the UI object 30 is not necessarily present in front of the other user. If the UI object 30 does not move by the movement process in the A-area, the UI object 30 maintains the position when the goggle apparatus 10 is passed to the other user. Thus, when the other user views the display section 21 of the goggle apparatus 10, the UI object 30 may be located behind the other user, or may be located in the right direction. In the exemplary embodiment, however, the UI object 30 moves by the movement process in the A-area. Thus, when the other user views the display section 21 of the goggle apparatus 10, the UI object 30 is located in front of the other user. Thus, the operability for the other user is improved.

(Details of Processing)

Next, an example of the processing performed by the information processing apparatus 2 is specifically described. First, data stored in the information processing apparatus 2 is described.

FIG. 14 is a diagram showing an example of data stored in (the DRAM 23 of) the information processing apparatus 2. As shown in FIG. 14, the information processing apparatus 2 stores a predetermined program, angular velocity data, virtual camera data, UI data, accumulation values X1 and X2, accumulation values Y1 and Y2, the amount of change Rx, and the amount of change Ry. In addition to these pieces of data, various pieces of data such as data regarding an object placed in the virtual space and operation data corresponding to an operation of the user are stored.

The program is a program for executing the processing described below. The program is stored, for example, in the non-volatile memory 24 or an external storage medium and loaded from the non-volatile memory 24 or the external storage medium into the DRAM 23. The program may be acquired from another apparatus via a network (e.g., a LAN, a WAN, the Internet, or the like).

The angular velocity data is data regarding angular velocities output from the inertial sensor 22.

The virtual camera data is data regarding the positions and the orientations of the left virtual camera VCL and the right virtual camera VCR.

The UI data is data regarding the position and the type of the UI object 30, the icons 31 to 34 included in the UI object 30, the information display object 35, and the like.

The accumulation value X1 is a value used in the movement process in the B-area and is also a value obtained by accumulating the amount of change x1 in the down direction (see FIG. 11). The accumulation value X2 is a value used in the movement process in the B-area and is also a value obtained by accumulating the amount of change x2 in the up direction (see FIG. 11).

The accumulation value Y1 is a value used in the movement process in the B-area and is also a value obtained by accumulating the amount of change y1 in the left direction (see FIG. 10). The accumulation value Y2 is a value used in the movement process in the B-area and is also a value obtained by accumulating the amount of change y2 in the right direction (see FIG. 10).

The amount of change Rx is a value used in the movement process in the B-area and is also the smaller value of the accumulation values X1 and X2 of the amounts of change in the line of sight of the virtual camera VC in the up-down direction (the pitch direction). The amount of change Ry is a value used in the movement process in the B-area and is also the smaller value of the accumulation values Y1 and Y2 of the amounts of change in the line of sight of the virtual camera VC in the left-right direction (the yaw direction). Rx and Ry are initially set to "0".

(Description of Main Flow)

Figure 15:
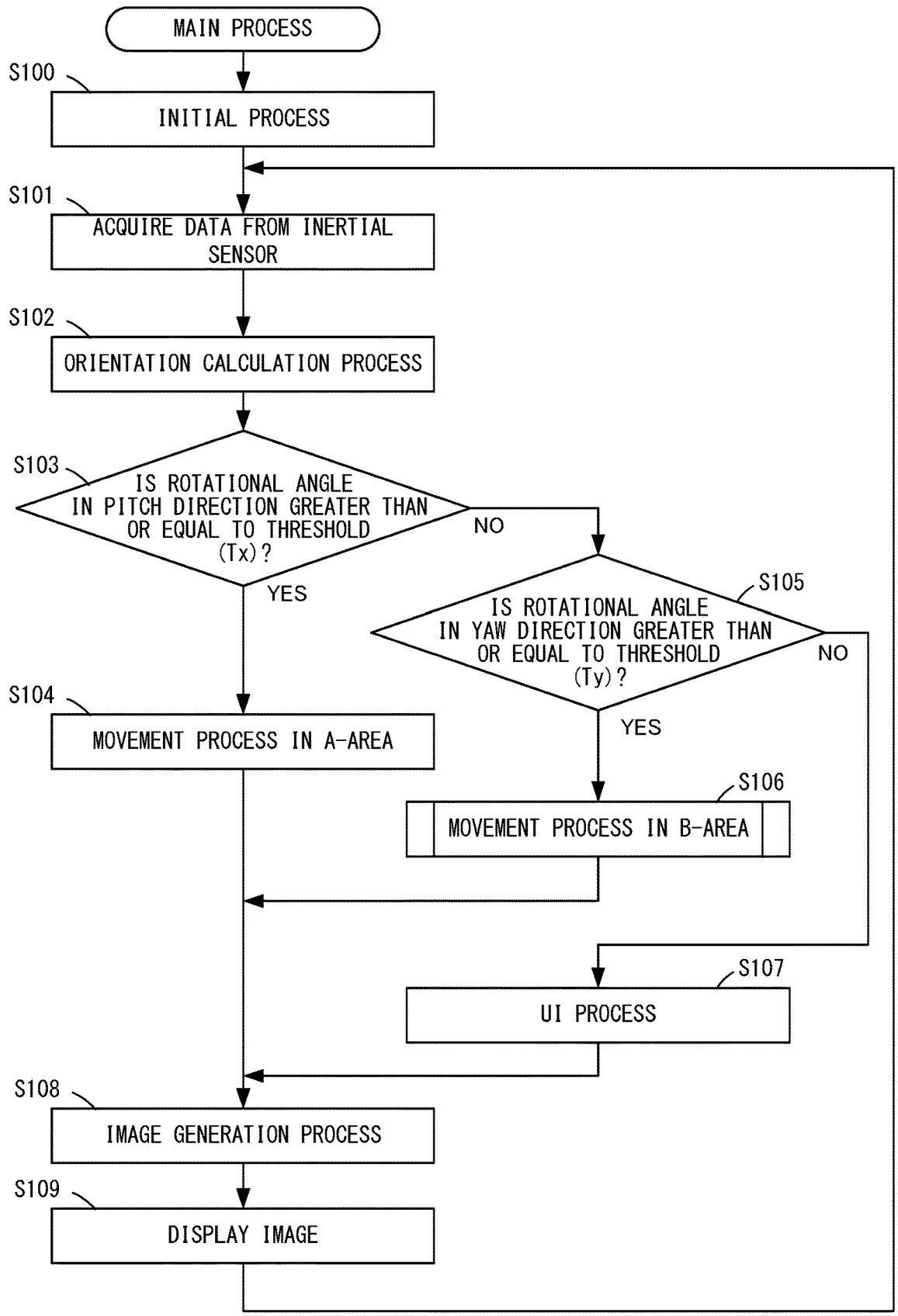
FIG. 15 is a flow chart showing an example non-limiting main process performed by a processor 20 of the information processing apparatus 2.

Next, the details of a main process performed by the information processing apparatus 2 are described. FIG. 15 is a flow chart showing an example of a main process performed by the processor 20 of the information processing apparatus 2. The processing shown in FIG. 15 is performed by the CPU or the GPU of the information processing apparatus 2 executing a predetermined program. FIG. 15 shows only processes regarding the movement of the UI object 30 described above and omits other processes (e.g., processes corresponding to an action (operation) of the user performed in the virtual space).

As shown in FIG. 15, first, the processor 20 performs an initial process (step S100). In the initial process, first, initialization regarding the orientation of the goggle apparatus 10 (the information processing apparatus 2) is performed. For example, the user is instructed to place the goggle apparatus 10 including the information processing apparatus 2 on a table or the like, thereby initializing the orientation of the goggle apparatus 10. In the initial process, the xyz coordinate system is set in the virtual space, and the UI object 30, the left virtual camera VCL, the right virtual camera VCR, the background, other objects, and the like are placed in the virtual space. After the process of step S100, the processor 20 repeatedly executes the processes of steps S101 to S109 every predetermined frame time (e.g., 1/60 seconds).

After the process of step S100, the processor 20 acquires data (e.g., angular velocity values) from the inertial sensor 22 (step S101).

Next, based on the data acquired from the inertial sensor 22 in step S101, the processor 20 performs an orientation calculation process (step S102). Specifically, based on the angular velocity values from the inertial sensor 22, the processor 20 calculates the orientation of the goggle apparatus 10 (the information processing apparatus 2). The processor 20 integrates the angular velocity values from the inertial sensor 22, thereby calculating a change in the orientation of the goggle apparatus 10 from the initialization in step S100 and acquiring the orientation of the goggle apparatus 10. In accordance with the calculated orientation of the goggle apparatus 10, the processor 20 sets the orientation of the virtual camera VC (the left virtual camera VCL and the right virtual camera VCR) in the virtual space. For example, the processor 20 sets the orientation of the virtual camera VC so that the orientations of the left virtual camera VCL and the right virtual camera VCR in the virtual space match the orientation of the goggle apparatus 10 in real space. Consequently, for example, when the goggle apparatus 10 rotates 5 degrees in the left direction, the left virtual camera VCL and the right virtual camera VCR also rotate 5 degrees in the left direction.

Subsequently, based on the orientation calculated in step S102, the processor 20 determines whether or not the line of sight of the rotational angle of the virtual camera VC in the pitch direction is greater than or equal to the second threshold (Tx) (step S103). When it is determined that the line of sight of the rotational angle of the virtual camera VC in the pitch direction is greater than or equal to the second threshold (Tx) (step S103: YES), the processor 20 performs the movement process in the A-area (step S104). When the process of step S104 is executed, the processor 20 executes the process of step S108 next.

Specifically, in step S104, the processor 20 moves the UI object 30 to the front of the virtual camera VC with respect to the left-right direction. The processor 20 moves the UI object 30 on a plane parallel to the xz plane in the virtual space while maintaining the height of the UI object 30 in the virtual space. For example, the processor 20 moves the UI object 30 along a circle centered at the position of the virtual camera VC (e.g., the intermediate position between the left virtual camera VCL and the right virtual camera VCR) so that the UI object 30 is located in front of the virtual camera VC with respect to the left-right direction. Consequently, the UI object 30 moves as shown in FIG. 12. The processor 20 may move the UI object 30 by a predetermined distance in one frame time. In this case, the process of step S104 is repeatedly executed every frame time, and the state where the UI object 30 moves to the front of the virtual camera VC with respect to the left-right direction is displayed on the display section 21.

On the other hand, when it is determined that the line of sight of the rotational angle of the virtual camera VC in the pitch direction is less than the second threshold (Tx) (step S103: NO), the processor 20 determines whether or not the rotational angle of the line of sight of the virtual camera VC in the yaw direction is greater than or equal to the first threshold (Ty) (step S105).

When it is determined that the rotational angle of the line of sight of the virtual camera VC in the yaw direction is greater than or equal to the first threshold (Ty) (step S105: YES), the processor 20 performs the movement process in the B-area (step S106). The details of the movement process in the B-area will be described below. When the process of step S106 is executed, the processor 20 executes the process of step S108 next.

When it is determined that the rotational angle of the line of sight of the virtual camera VC in the yaw direction is less than the first threshold (Ty) (step S105: NO), the processor 20 performs a UI process (step S107). In the UI process, a selection process for selecting each icon in the UI object 30 and a process after the selection are performed. For example, when the pointer 37 located at a predetermined position (e.g., the center) in a stereoscopic image is present in the display area of the icon 31 in the UI object 30, the icon 31 is selected. Each icon is assigned a process in a case where the icon is selected (e.g., the switching of screens, an operation in a game, the start of an application, or the like). The processor 20 performs the process corresponding to the selected icon. In step S107, the processor 20 resets the amounts of change Rx and Ry and the accumulation values X1, X2, Y1, and Y2 calculated in step S106 described below to "0". When the process of step S107 is executed, the processor 20 executes the process of step S108 next.

In step S108, the processor 20 performs an image generation process. Specifically, the processor 20 captures the virtual space using the left virtual camera VCL, thereby generating a left eye image, and also captures the virtual space using the right virtual camera VCR, thereby generating a right eye image.

Then, the processor 20 displays on the display section 21 the left eye image and the right eye image generated in step S108 (step S109). Specifically, the processor 20 displays the left eye image in the left area 21L and displays the right eye image in the right area 21R. When the process of step S109 is executed, the processor 20 executes the process of step S101 again.

(Movement Process in B-Area)

Figure 16:
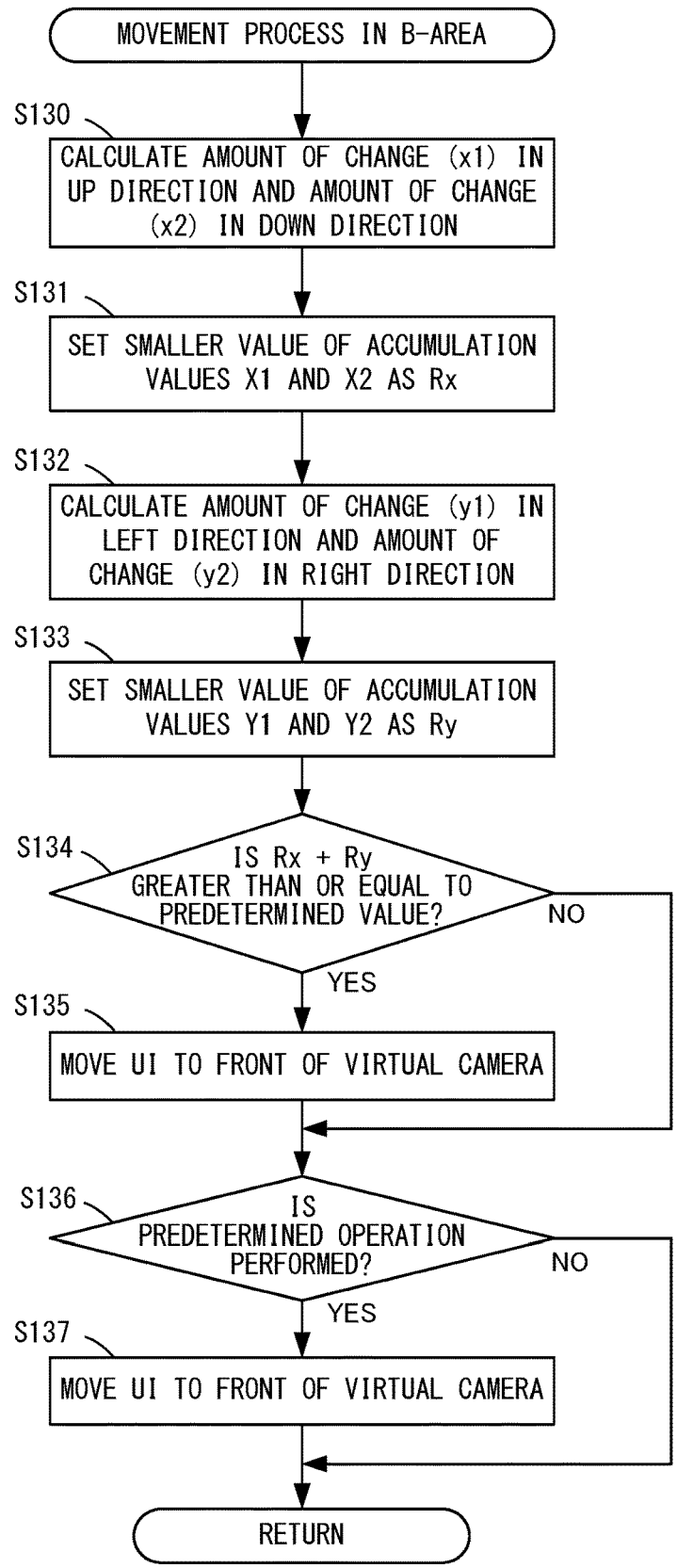
FIG. 16 is a flow chart showing an example non-limiting movement process in a B-area in step S106.

Next, the movement process in the B-area in the above step S106 is described. FIG. 16 is a flow chart showing an example of the movement process in the B-area in step S106.

As shown in FIG. 16, first, the processor 20 calculates the amount of change x1 in the up direction and the amount of change x2 in the down direction in the rotational angle of the line of sight of the virtual camera VC in the pitch direction in the virtual space (step S130). For example, based on the orientation of the virtual camera VC in the previous processing loop and the orientation of the virtual camera VC in the current processing loop, the processor 20 determines whether or not the line of sight changes in the up direction or the down direction, thereby calculating the amount of change x1 or x2 in the line of sight of the virtual camera VC. Then, the processor 20 adds the calculated amount of change x1 or x2 to the accumulation value X1 or X2. For example, when the line of sight of the virtual camera VC continues to change in the up direction, the accumulation value X1 increases, while the amount of change x2 in the down direction is "0" degrees, and the accumulation value X2 of the amount of change x2 is also "0" degrees. For example, as in the example of FIG. 11, when the virtual camera VC rotates x1 degrees in the down direction and then rotates x2 degrees in the up direction, "x1" is set as the accumulation value X1, and "x2" is set as the accumulation value X2.

Next, the processor 20 sets the smaller value of the accumulation values X1 and X2 updated in step S130 as the amount of change Rx in the up-down direction (step S131).

Subsequently, the processor 20 calculates the amount of change y1 in the left direction and the amount of change y2 in the right direction in the rotational angle of the line of sight of the virtual camera VC in the yaw direction in the virtual space (step S132). For example, based on the orientation of the virtual camera VC in the previous processing loop and the orientation of the virtual camera VC in the current processing loop, the processor 20 determines whether or not the line of sight changes in the left direction or the right direction, thereby calculating the amount of change y1 or y2 in the line of sight of the virtual camera VC. Then, the processor 20 adds the calculated amount of change y1 or y2 to the accumulation value Y1 or Y2. For example, when the line of sight of the virtual camera VC continues to change in the left direction, the accumulation value Y1 increases, while the amount of change y2 in the right direction is "0" degrees, and the accumulation value Y2 of the amount of change y2 is also "0" degrees. For example, as in the example of FIG. 10, when the virtual camera VC rotates y1 degrees in the left direction and then rotates y2 degrees in the right direction, "y1" is set as the accumulation value Y1, and "y2" is set as the accumulation value Y2.

Next, the processor 20 sets the smaller value of accumulation values Y1 and Y2 updated in step S132 as the amount of change Ry in the left-right direction (step S133).

Subsequently, the processor 20 determines whether or not the sum of Rx set in step S131 and Ry set in step S133 is greater than or equal to a predetermined value (step S134).

When it is determined that "Rx+Ry" is greater than or equal to the predetermined value (step S134: YES), the processor 20 moves the UI object 30 to the front of the virtual camera VC (step S135). Specifically, the processor 20 moves the UI object 30 on a plane parallel to the xz plane while maintaining the height of the UI object 30 in the virtual space. For example, the processor 20 moves the UI object 30 along a circle centered at the position of the virtual camera VC (e.g., the intermediate position between the left virtual camera VCL and the right virtual camera VCR) so that the UI object 30 is located in front of the virtual camera VC in the left-right direction. Consequently, the UI object 30 moves as shown in FIG. 8.

When the process of step S135 is executed, or when the determination is NO in step S134, the processor 20 determines whether or not a predetermined operation is performed (step S136). Here, the "predetermined operation" may be, for example, the operation of pressing, tapping, or hitting a predetermined button or place in the goggle apparatus 10.

When it is determined that the predetermined operation is performed (step S136: YES), the processor 20 executes the process of step S137. The process of step S137 is similar to the process of step S135.

When the process of step S137 is executed, or when the determination is NO in step S136, the processing of the processor 20 shown in FIG. 16 ends, and the processing returns to FIG. 15.

The processes shown in the above flow charts are merely illustrative, and the order and the contents of the processes may be appropriately changed. A threshold may or may not be included in a determination. For example, "the determination of whether or not a certain value is greater than or equal to a threshold" may be replaced by "the determination of whether or not a certain value is greater than a threshold".

As described above, when the line of sight of the virtual camera VC is present in the B-area, in the movement process in the B-area, it is detected that the line of sight of the virtual camera VC changes from one direction to the other direction with respect to the yaw direction or the pitch direction. Specifically, when the value of Rx or Ry set in step S133 or S131 exceeds "0" degrees, the line of sight of the virtual camera VC changes from one direction to the other direction. In a case where the line of sight of the virtual camera VC changes from one direction to the other direction, and when a value obtained by accumulating the rotational angle in the other direction (Rx and/or Ry) is greater than or equal to a predetermined value, the UI object 30 is moved to the front of the virtual camera VC. Consequently, the user can look over a portion of the virtual space other than a portion of the virtual space where the UI object 30 is located. Further, when the user wishes to view the UI object 30, the user can move the UI object 30 to the front.

When the line of sight of the virtual camera VC is present in the A-area, in the movement process in the A-area, the UI object 30 is moved so that the UI object 30 is always located in front of the virtual camera VC with respect to the left-right direction. Consequently, for example, by directing the goggle apparatus 10 in the up direction or the down direction, it is possible to move the UI object 30 to the front.

(Variations)

While image processing according to the exemplary embodiment has been described above, the exemplary embodiment is merely an example and can be modified as follows, for example.

For example, in the above exemplary embodiment, in the movement process in the A-area and the movement process in the B-area, the UI object 30 is moved so that the UI object 30 is located in front of the virtual camera VC. In another exemplary embodiment, control (a change in the orientation and/or the movement) of the virtual camera VC may be performed so that the UI object 30 is located in front of the virtual camera VC. For example, the orientation of the virtual camera VC may be changed or the virtual camera VC may be moved by fixing the UI object 30 so that the UI object 30 is located in front of the virtual camera VC. In another exemplary embodiment, both the movement of the UI object 30 and control of the virtual camera VC may be performed so that the UI object 30 is located in front of the virtual camera VC. That is, at least either one of the movement of the UI object 30 and control (a change in the orientation and/or the movement) of the virtual camera VC may be performed so that the UI object 30 is located in front of the virtual camera VC. When the movement of the UI object 30 is performed, as shown in the above exemplary embodiment, the UI object 30 may be moved, and the UI object 30 may also be rotated so that the UI object 30 is directed to the virtual camera VC.

In the above exemplary embodiment, when a condition is satisfied, the UI object 30 is moved to the front of the virtual camera VC. In another exemplary embodiment, when a condition is satisfied, the UI object 30 may be moved, or the virtual camera VC may be controlled (e.g., the virtual camera may be moved and/or rotated), or both the movement of the UI object 30 and control of the virtual camera VC may be performed so that at least a part of the UI object 30 is located in the image capturing range of the virtual camera VC.

In the above exemplary embodiment, in the movement process in the B-area, in a case where the rotation of the virtual camera VC in the yaw direction or the pitch direction changes from one direction to the other direction, it is determined whether or not the smaller value of a value obtained by accumulating the rotational angle in the other direction and a value obtained by accumulating the rotational angle in the one direction is greater than or equal to a predetermined value. Specifically, it is determined whether or not the sum of the amounts of change Ry and Rx is greater than or equal to a predetermined value. The determination of whether or not the UI object 30 is to be moved may be made by another method. For example, in another exemplary embodiment, it may be determined whether or not either one of the above amounts of change Ry and Rx is greater than or equal to a predetermined value. In a case where the rotation of the virtual camera VC in the yaw direction or the pitch direction changes from one direction to the other direction, and when a value obtained by accumulating the rotational angle in the other direction and/or a value obtained by accumulating the rotational angle in the one direction are greater than or equal to a predetermined value, the UI object 30 may be moved.

In another exemplary embodiment, the rotational angle in the other direction and the rotational angle in one direction may not be accumulated, and when the rotational angle in the other direction and/or the rotational angle in one direction are greater than or equal to a predetermined value, the UI object 30 may be moved. In this case, in a case where the rotation of the virtual camera VC in one direction and the rotation of the virtual camera VC in the other direction are repeated multiple times, and when the rotational angle in the other direction or the rotational angle in the one direction at each time is less than a predetermined value, the UI object 30 is not moved. On the other hand, in a case where the rotation of the virtual camera VC in one direction and the rotation of the virtual camera VC in the other direction are repeated multiple times, and when the rotational angle in the other direction or the rotational angle in the one direction at a time is greater than or equal to the predetermined value, the UI object 30 is moved.

The determination of whether or not the amount of change Ry with respect to the yaw direction is greater than or equal to the predetermined value and the determination of whether or not the amount of change Rx with respect to the pitch direction is greater than or equal to the predetermined value may be separately made. In this case, when either one of Rx and Ry is greater than or equal to the predetermined value, the UI object 30 is moved.

A threshold may be varied between the amount of change Ry with respect to the yaw direction and the amount of change Rx with respect to the pitch direction. For example, regarding the yaw direction, when Ry is greater than or equal to a first predetermined value (e.g., 4 to 8 degrees), the UI object 30 may be moved. Regarding the pitch direction, when Rx is greater than or equal to a second predetermined value (e.g., 10 to 20 degrees) greater than the first predetermined value, the UI object 30 may be moved. These thresholds may be varied in accordance with the type of the UI object 30 to be displayed, or the scene of the virtual space (the scene of the background).

In the above exemplary embodiment, under a first condition that the line of sight of the virtual camera VC reverses from one direction to the other direction with respect to the yaw direction and the pitch direction, in a case where the first condition is satisfied, and when a second condition is further satisfied (specifically, when the accumulation value of the rotational angle in the other direction is greater than or equal to a predetermined value), the UI object 30 is moved to the front of the virtual camera VC. In another exemplary embodiment, when the first condition is satisfied, i.e., when the line of sight of the virtual camera VC reverses from one direction to the other direction, the UI object 30 may be moved to the front of the virtual camera VC. In this case, at the moment when the line of sight of the virtual camera VC reverses, the UI object 30 moves to the front of the virtual camera VC, regardless of the accumulation values.

In another exemplary embodiment, when the number of times the line of sight of the virtual camera VC reverses is greater than or equal to a predetermined number of times, the UI object 30 may be moved to the front of the virtual camera VC. For example, in a case where the virtual camera VC rotates in the left direction, enters the B-area, and then repeats rotating in the right direction and the left direction, and when the number of times the virtual camera VC reverses (reverses in the right direction and reverses in the left direction) is greater than or equal to a predetermined number of times, the UI object 30 may be moved.

In another exemplary embodiment, when the line of sight of the virtual camera VC reverses from one direction (e.g., the left direction) to the other direction (e.g., the right direction), based on the angle in the other direction (the right direction) and the one direction (the left direction) after the reversal, the UI object 30 may be moved.

That is, in the movement process in the B-area, based on the reversal of the line of sight of the virtual camera VC from one direction to the other direction, the UI object 30 may be moved to the front of the virtual camera VC. Here, "based on the reversal of the line of sight of the virtual camera VC from one direction to the other direction" includes the following cases, for example.

In a case where the line of sight of the virtual camera VC reverses from one direction to the other direction in a predetermined rotation direction, the rotational angle in the other direction or the accumulation value (Rx or Ry described above) of the rotational angle is greater than or equal to a predetermined value.

The number of times the line of sight of the virtual camera VC reverses in a predetermined rotation direction is a predetermined value.

The line of sight of the virtual camera VC changes from one direction to the other direction in a predetermined rotation direction.

In the above exemplary embodiment, based on the angle of the line of sight of the virtual camera VC, it is determined which of the "A-area" and the "B-area" shown in FIG. 9 the line of sight of the virtual camera VC is present in. Then, the UI object 30 is moved in accordance with each area. In another exemplary embodiment, instead of the angle of the line of sight of the virtual camera VC, for example, in accordance with which of the "A-area" and the "B-area" the position of a pointer is present in, the UI object 30 may be moved. For example, when a pointer is displayed at a predetermined position (e.g., the center) in a stereoscopic image, and the pointer is present in the A-area, the above "movement process in the A-area" may be performed. When the pointer is present in the B-area, the above "movement process in the B-area" may be performed.

In the above exemplary embodiment, when a condition is satisfied, the UI object 30 is moved. An object to be moved may be not only the UI object 30 but also any object. For example, when a condition is satisfied, a character object conveying predetermined information to the user may be moved to the front of the virtual camera VC.

In the above exemplary embodiment, the orientation of the goggle apparatus 10 (the information processing apparatus 2) is detected based on data from the inertial sensor 22 included in the information processing apparatus 2. In another exemplary embodiment, the orientation of the goggle apparatus 10 may be detected by another method. For example, the image display system 1 may include a camera that externally captures the goggle apparatus 10, capture the goggle apparatus 10 or a marker attached to the goggle apparatus 10 using the camera, and acquire the orientation of the goggle apparatus 10 based on the captured image. The goggle apparatus 10 may include a camera, and the orientation of the goggle apparatus 10 may be acquired based on a change in an image captured by the camera.

In the above exemplary embodiment, the rotation direction of the line of sight of the virtual camera VC is divided into a component in the left-right direction (the yaw direction) and a component in the up-down direction (the pitch direction) in the virtual space, and based on a change in the line of sight of the virtual camera VC from one direction to the other direction regarding the component in the left-right direction or the up-down direction, the UI object 30 is moved. For example, when the line of sight of the virtual camera VC changes from one direction (e.g., the left direction) to the other direction (e.g., the right direction) regarding the component in the left-right direction, the amounts of rotation in the other direction and/or the one direction regarding the component in the left-right direction may be calculated. When the calculated amounts of rotation are greater than or equal to a predetermined value (which may or may not include the predetermined value), the UI object 30 is moved. In another exemplary embodiment, based on a change in the line of sight of the virtual camera VC from one direction (e.g., the direction from the lower left to the upper right) to the other direction (e.g., the direction from the upper right to the lower left) in an oblique direction, the UI object 30 may be moved.

That is, based on a change in a predetermined component (e.g., a component in the left-right direction, a component in the up-down direction, or a component in an oblique direction) of the rotation direction of the line of sight of the virtual camera VC from one direction to the other direction, the UI object 30 may be moved.

In the above exemplary embodiment, when the line of sight of the virtual camera VC is present in the A-area, the UI object 30 is moved following the rotation of the virtual camera VC in the left-right direction. In another exemplary embodiment, after the line of sight of the virtual camera VC comes out of the UI area and enters the A-area, and at the timing when the line of sight of the virtual camera VC returns to the UI area, the UI object 30 may be moved to the front of the virtual camera VC in the left-right direction (the yaw direction) (or the virtual camera VC may be controlled). That is, the UI object 30 may be moved at any timing so long as after the user removes the goggle apparatus 10 (e.g., after the user directs the bottom surface 15 of the goggle apparatus 10 in the up or down direction), and when the user views the display section by putting the goggle apparatus 10 on their face, the UI object 30 is controlled to be seen in front. For example, at the time when the line of sight of the virtual camera VC enters the A-area, the UI object 30 may be moved following the rotation of the virtual camera VC in the left-right direction. Alternatively, at the time when the line of sight of the virtual camera VC enters the A-area and returns to the UI area, the UI object 30 may be moved to the front of the virtual camera VC in the left-right direction.

In the above exemplary embodiment, when the line of sight of the virtual camera VC is present in the A-area, the UI object 30 is controlled to be located in front of the virtual camera VC in the yaw direction. In a case where the line of sight of the virtual camera VC is present in the B-area, under the condition that the line of sight of the virtual camera VC reverses, the UI object 30 is controlled to be located in front of the virtual camera VC. "Front" as used herein includes not only the exact front but also the substantial front. The exact front means that a straight line extending from the line of sight of the virtual camera VC intersects a straight line parallel to the y-axis passing through the center in the left-right direction of the UI object 30. In other words, the "exact front" means that the line of sight of the virtual camera VC is not shifted in the left-right direction of the UI object 30. The "substantial front" also includes a case where the line of sight of the virtual camera VC is shifted in the left-right direction of the UI object 30. For example, "the UI object 30 is located at the substantial front of the virtual camera VC" may mean that a surface perpendicular to the xz plane passing through the line of sight of the virtual camera VC intersects the UI object 30. In this case, when the rotational angle of the virtual camera VC in the pitch direction relative to the UI object 30 is "0" degrees, a straight line extending from the line of sight of the virtual camera VC hits the UI object 30. "The UI object is moved so that the UI object 30 is located at the substantial front of the virtual camera VC" may mean that when the rotational angle of the virtual camera VC in the pitch direction relative to the UI object 30 is "0" degrees, the UI object is moved so that at least a part of the UI object 30 enters the field of view of the virtual camera VC, and the rotational angle of the virtual camera VC in the yaw direction relative to the UI object 30 is smaller than before the movement of the UI object. That is, "front" as used herein means that the rotational angle of the virtual camera in the yaw direction relative to the UI object (a predetermined object) is a predetermined angle (a certain angle). The "predetermined angle" may be such an angle that when the rotational angle of the virtual camera in the pitch direction relative to the predetermined object is "0" degrees, at least a part of the predetermined object is included in the field of view of the virtual camera.

In the above exemplary embodiment, when the line of sight of the virtual camera VC is present in the A-area above the UI area or the A-area below the UI area, the above movement process in the A-area is performed. In another exemplary embodiment, only when the line of sight of the virtual camera VC is present in the A-area above the UI area, the above movement process in the A-area may be performed. Conversely, only when the line of sight of the virtual camera VC is present in the A-area below the UI area, the above movement process in the A-area may be performed.

The size and the shape of each area shown in FIG. 9 are merely examples, and each area may have any other size and shape. When the line of sight of the virtual camera VC is present at the boundary between areas, it may be determined that the line of sight of the virtual camera VC is present in the UI area, or it may be determined that the line of sight of the virtual camera VC is present in an area (i.e., the A-area or the B-area) different from the UI area.

In the above exemplary embodiment, based on two virtual cameras, namely the left virtual camera VCL and the right virtual camera VCR, a left eye image and a right eye image having parallax with each other are generated. In another exemplary embodiment, an image may be generated based on a single virtual camera, and a left eye image and a right eye image having parallax with each other may be generated by deforming the generated image. That is, "generating a left eye image and a right eye image based on a virtual camera" in the present specification includes both generating a left eye image and a right eye image based on a pair of the left virtual camera VCL and the right virtual camera VCR (i.e., based on a plurality of virtual cameras), and generating a left eye image and a right eye image based on a single virtual camera.

In the above exemplary embodiment, the display section 21 of the goggle apparatus 10 is attachable to and detachable from the goggle main body. In another exemplary embodiment, the display section 21 of the goggle apparatus 10 may be fixed to the goggle main body. That is, the goggle apparatus 10 may be obtained by integrally forming a display section for displaying a left-eye image and a right-eye image and an information processing apparatus for generating the left-eye image and the right-eye image. The display section of the goggle apparatus 10 is not limited to the display section 21 as described above. For example, the display section of the goggle apparatus 10 may include two display sections (a left eye display section viewed by the left eye of the user and a right eye display section viewed by the right eye of the user). The display section of the goggle apparatus 10 may have any shape. For example, the display section itself of the goggle apparatus 10 may be formed into an approximate circle (a circle or an ellipse) as in the left opening 16L and the right opening 16R. Two left and right display sections formed into squares or rectangles may be used as the display section of the goggle apparatus 10. The display section of the goggle apparatus 10 may be a display device such as a liquid crystal display device or an organic EL display device, or may be a display device using a projection method for projecting a video onto a projection surface.

The configuration of the image display system 1 according to the above exemplary embodiment is merely an example, and is not limited to the above. For example, in the above exemplary embodiment, the goggle apparatus 10 is formed of the information processing apparatus 2 including the display section 21 that displays an image and the processor 20 that performs the process of generating an image, and the goggle main body. That is, the image display system 1 is formed of the goggle apparatus 10 including the goggle main body and the information processing apparatus 2. In another exemplary embodiment, a goggle apparatus including a display section (a goggle apparatus integrated with a display section) and an information processing apparatus that performs the process of generating an image may be formed as separate apparatuses, and the image display system 1 may be formed of these plurality of apparatuses. In this case, the goggle apparatus and the information processing apparatus may be connected together in a wired or wireless manner, and a left eye image and a right eye image generated by the information processing apparatus may be transmitted to the goggle apparatus and viewed by the user. The information processing apparatus may perform a process regarding the movement of the UI object 30 described above and transmit the result of the process to the goggle apparatus, the goggle apparatus may generate a left eye image and a right eye image, and the left eye image and the right eye image may be viewed by the user. The goggle apparatus and the information processing apparatus may be connected together via a network (a LAN, a WAN, the Internet, or the like).

In the exemplary embodiment, the goggle apparatus is used in which the user looks into the display section while keeping holding the goggle apparatus with their hand. In another exemplary embodiment, the goggle apparatus may not need to be held by the hand of the user, and may be a head-mounted display fixedly attached to the head of the user.

While the exemplary embodiment has been described, the above description is merely illustrative, and the exemplary embodiment may be improved and modified in various manners.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An image display system, comprising:
a goggle apparatus; and
processing circuitry including at least one processor, wherein the processing circuitry is configured to:
place an object in a virtual space;
display, on a display section of the goggle apparatus, an image captured by a virtual camera in the virtual space;
rotate the virtual camera in the virtual space based on a rotation of the goggle apparatus;
calculate an amount of rotation of the virtual camera;
detect change of a rotation direction of the goggle apparatus from one direction to the other direction; and
based on the detection of the change of the rotation direction and the amount of rotation of the virtual camera, perform a movement of the object so that at least a part of the object is located within an image capturing range of the virtual camera.

2. The image display system according to claim 1, wherein the processing circuitry is configured to: detect change of the rotation direction of the goggle apparatus from one direction to the other direction at least in a first axis.

3. The image display system according to claim 2, wherein the first axis is a yaw axis.

4. The image display system according to claim 1, wherein the processing circuitry is configured to: detect change of the rotation direction of the goggle apparatus from one direction to the other direction when the vector components of the one direction and the other direction based on a certain rotation axis reverse.

5. The image display system according to claim 1, wherein the processing circuitry is further configured to:

calculate amounts of rotation in the other direction and/or the one direction; and based on the amounts of rotation in the other direction and/or the one direction, perform the movement of the object so that at least the part of the object is located within the image capturing range of the virtual camera.

6. The image display system according to claim 5, wherein, when the amounts of rotation in the other direction and/or the one direction are greater than or equal to a threshold, perform the movement of the object so that at least the part of the object is located within the image capturing range of the virtual camera.

7. The image display system according to claim 6, wherein the processing circuitry is further configured to: when accumulation values of the amounts of rotation in the other direction and/or the one direction are greater than or equal to a threshold after the change of the rotation direction is detected, perform the movement of the object so that at least the part of the object is located within the image capturing range of the virtual camera.

8. The image display system according to claim 1, wherein the processing circuitry is further configured to:
calculate a first amount of rotation in the one direction, and a second amount of rotation in the other direction;
compare the first amount of rotation and the second amount of rotation; and
detect the change of the rotation direction based on a result of the comparison.

9. The image display system according to claim 8, wherein the processing circuitry is further configured to detect the change of the rotation direction based on the smaller of the first amount of rotation and the second amount of rotation.

10. The image display system according to claim 8, wherein the processing circuitry is further configured to:
calculate an accumulation value of the first amount of rotation and an accumulation value of the second amount of rotation; and
detect the change of the rotation direction based on the smaller of the accumulation value of the first amount of rotation and the accumulation value of the second amount of rotation.

11. The image display system according to claim 1, wherein, when a sum of an amount of change of the rotation direction in a left-right direction and an amount of change of the rotation direction in an up-down direction is greater than or equal to a threshold, detect change of the rotation direction.

12. The image display system according to claim 1, wherein the processing circuitry is further configured to:
set a pointer indicating the object;
based on the rotation of the goggle apparatus, move a position indicated by the pointer; and
after the pointer moves away from an area based on the object, and when a moving direction of the pointer reverses, detect the change of the rotation direction.

13. The image display system according to claim 12, wherein the processing circuitry is further configured to: when the pointer is not present in the area, calculate an amount of change in rotation in the one direction and the other direction.

14. The image display system according to claim 13, wherein the processing circuitry is further configured to: when the pointer enters the area, reset the amount of change in rotation in the one direction and the other direction.

15. The image display system according to claim 1, wherein the processing circuitry is further configured to: when a line of sight of the virtual camera based on the object is at a specific angle, detect the change of the rotation direction.

16. The image display system according to claim 1, wherein the processing circuitry is further configured to:
select the object in accordance with an orientation of the virtual camera; and
when the object is not selected, perform the movement of the object so that at least the part of the object is located within the image capturing range of the virtual camera.

17. The image display system according to claim 1, wherein the processing circuitry is further configured to: even when the change of the rotation direction is not detected, in accordance with an operation of a user, perform the movement of the object so that at least the part of the object is located within the image capturing range of the virtual camera.

18. The image display system according to claim 1, wherein the processing circuitry is further configured to:
rotate the virtual camera so that the virtual camera is in at least a first orientation in which at least a part of the object is located within the image capturing range of the virtual camera, and a second orientation in which the object is located outside the image capturing range of the virtual camera, wherein
the one direction is a direction in which the virtual camera comes close to the second orientation, and
the other direction is a direction in which the virtual camera comes close to the first orientation;
in a case where the virtual camera is in the second orientation, and when a line of sight of the virtual camera rotates in the other direction, detect the change of the rotation direction;
in a case where the virtual camera is in the second orientation, and when the line of sight of the virtual camera rotates in the one direction without rotating in the other direction, or when the line of sight of the virtual camera does not rotate, not detect the change of the rotation direction; and
when the change of the rotation direction is detected, perform the movement of the object so that at least the part of the object is located within the image capturing range of the virtual camera, and when the change of the rotation direction is not detected, not perform the movement of the object so that at least the part of the object is located within the image capturing range of the virtual camera.

19. An image display method performed by an image display system including a goggle apparatus, the image display method comprising:
placing an object in a virtual space;
displaying, on a display section of the goggle apparatus, an image captured by a virtual camera in the virtual space;
rotating the virtual camera in the virtual space based on a rotation of the goggle apparatus;
calculating an amount of rotation of the virtual camera;
detecting change of a rotation direction of the goggle apparatus from one direction to the other direction; and
based on the detection of the change of the rotation direction and the amount of rotation of the virtual camera, performing a movement of the object so that at least a part of the object is located within an image capturing range of the virtual camera.

20. A non-transitory computer readable storage medium having stored therein an image display program executed by a processor of an apparatus configured to display an image on a display section of a goggle apparatus, the image display program causing the processor to provide execution comprising:

placing an object in a virtual space;

displaying, on a display section of the goggle apparatus, an image captured by a virtual camera in the virtual space;

rotating the virtual camera in the virtual space based on a rotation of the goggle apparatus;

calculating an amount of rotation of the virtual camera;

detecting change of a rotation direction of the goggle apparatus from one direction to the other direction; and based on the detection of the change of the rotation direction and the amount of rotation of the virtual camera, performing a movement of the object so that at least a part of the object is located within an image capturing range of the virtual camera.

* * * * *